(12) United States Patent
Yamada et al.

(10) Patent No.: US 11,797,232 B2
(45) Date of Patent: Oct. 24, 2023

(54) MEMORY CONTROLLER, MEMORY SYSTEM, AND INFORMATION PROCESSING SYSTEM

(71) Applicant: Kioxia Corporation, Tokyo (JP)

(72) Inventors: Hideki Yamada, Yokohama (JP); Masanobu Shirakawa, Chigasaki (JP); Naomi Takeda, Yokohama (JP)

(73) Assignee: Kioxia Corporation, Tokyo (JP)

( * ) Notice: Subject to any disclaimer, the term of this patent is extended or adjusted under 35 U.S.C. 154(b) by 38 days.

(21) Appl. No.: 17/695,086

(22) Filed: Mar. 15, 2022

(65) Prior Publication Data
US 2023/0087010 A1    Mar. 23, 2023

(30) Foreign Application Priority Data

Sep. 17, 2021    (JP) .................. 2021-152058

(51) Int. Cl.
*G06F 12/00*    (2006.01)
*G06F 3/06*    (2006.01)
*G06F 12/02*    (2006.01)

(52) U.S. Cl.
CPC .......... *G06F 3/0659* (2013.01); *G06F 3/0604* (2013.01); *G06F 3/0631* (2013.01); *G06F 3/0679* (2013.01); *G06F 12/0238* (2013.01); *G06F 2212/7201* (2013.01)

(58) Field of Classification Search
CPC .... G06F 3/0659; G06F 3/0604; G06F 3/0631; G06F 3/0679; G06F 12/0238; G06F 2212/7201; G11C 2211/5641; G11C 29/76; G11C 29/785
See application file for complete search history.

(56) References Cited

U.S. PATENT DOCUMENTS

| | | | |
|---|---|---|---|
| 8,775,868 B2 | 7/2014 | Colgrove et al. | |
| 10,642,517 B2 | 5/2020 | Kankani et al. | |
| 2014/0006851 A1* | 1/2014 | Kimura | G06F 11/108 714/6.24 |
| 2016/0004440 A1* | 1/2016 | Marukame | G06F 3/0656 711/103 |
| 2019/0087100 A1* | 3/2019 | Kim | G06F 3/0652 |
| 2021/0082483 A1 | 3/2021 | Takeda et al. | |

FOREIGN PATENT DOCUMENTS

| | | |
|---|---|---|
| JP | 2010-026961 A | 2/2010 |
| JP | 5894167 B2 | 3/2016 |
| JP | 2021-043912 A | 3/2021 |
| JP | 2021-047970 A | 3/2021 |

\* cited by examiner

*Primary Examiner* — John A Lane
(74) *Attorney, Agent, or Firm* — Oblon, McClelland, Maier & Neustadt, L.L.P.

(57) ABSTRACT

A memory controller according to an embodiment includes a control circuit configured to duplicate and store data received from an external host device. The control circuit is configured to, when a write request specifying first data and a first logical address is received: i) allocate a first physical address corresponding to a first bit to the first logical address, and order a first memory device to write the first data to the first physical address; and ii) allocate a first mirroring physical address corresponding to a second bit to the first physical address, and order a second memory device to write the first data to the first mirroring physical address. A number of reads the first bit is different from a number of reads for the second bit.

20 Claims, 22 Drawing Sheets

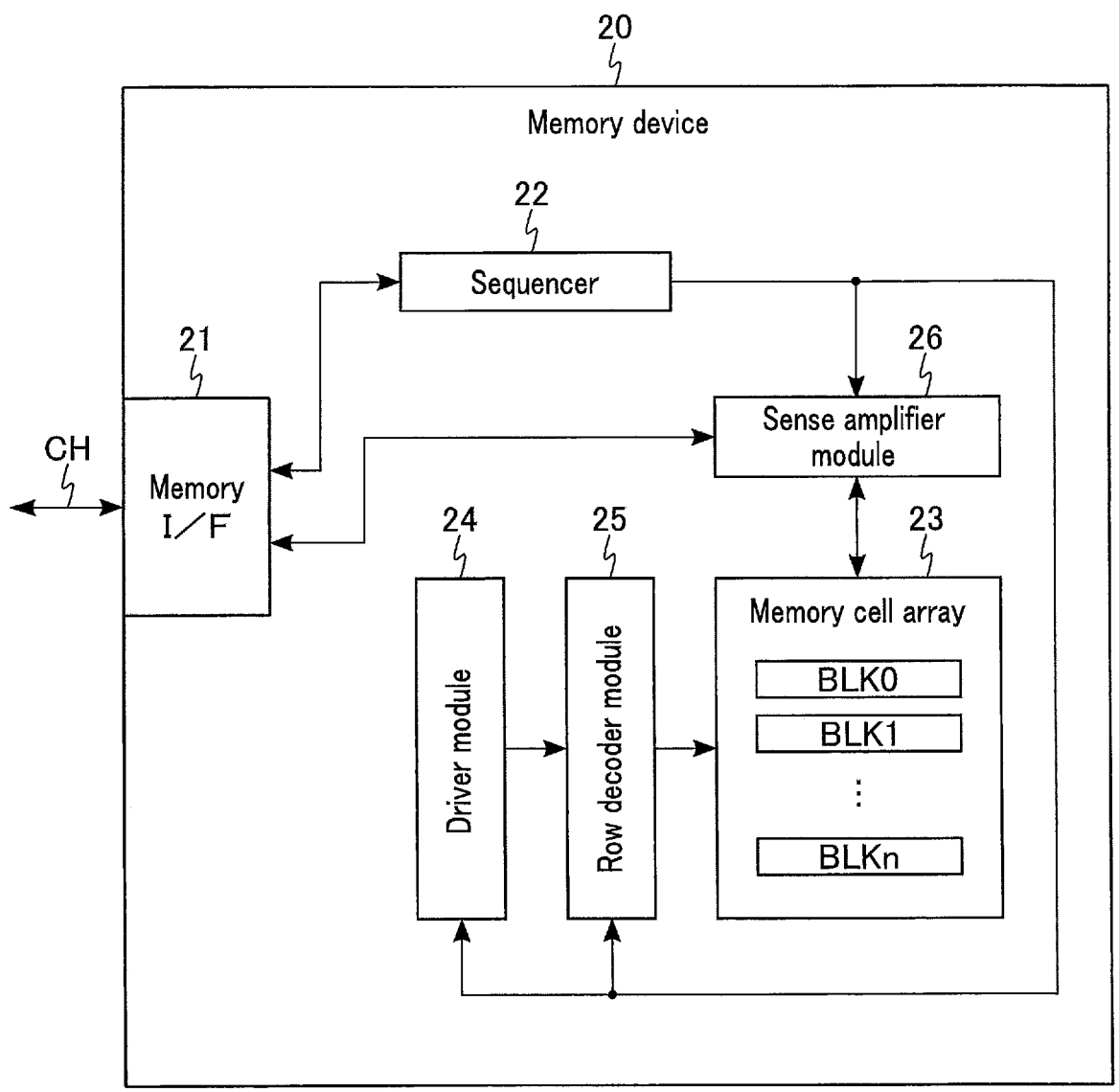
F I G. 3

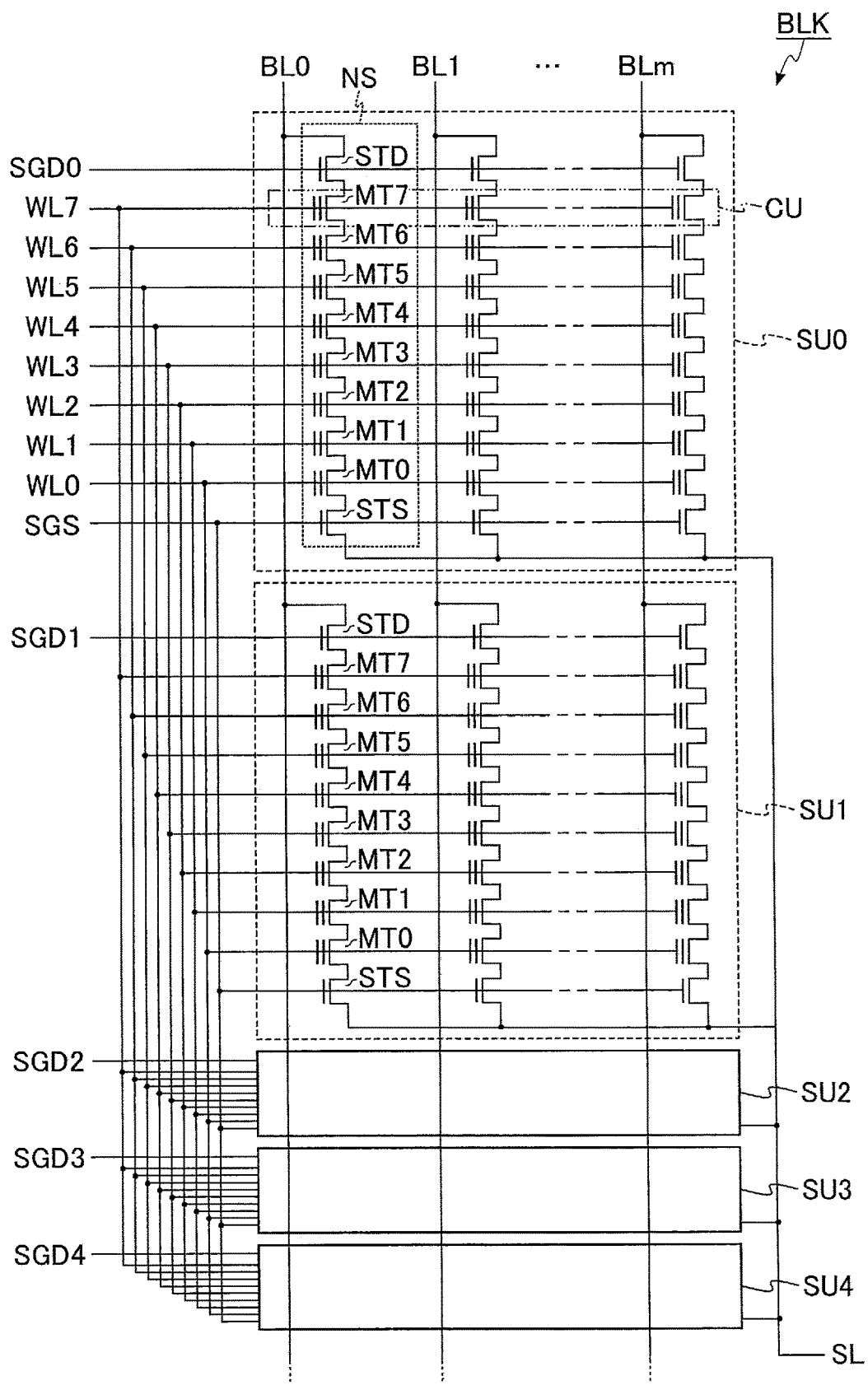
F I G. 4

|  | Number of reads | |
| --- | --- | --- |
|  | Principal storage region 20P | Mirroring storage region 20M |
| Lower read | 1 | 8 |
| Middle read | 2 | 4 |
| Upper read | 4 | 2 |
| Top read | 8 | 1 |

Address selected in read

FIG. 13

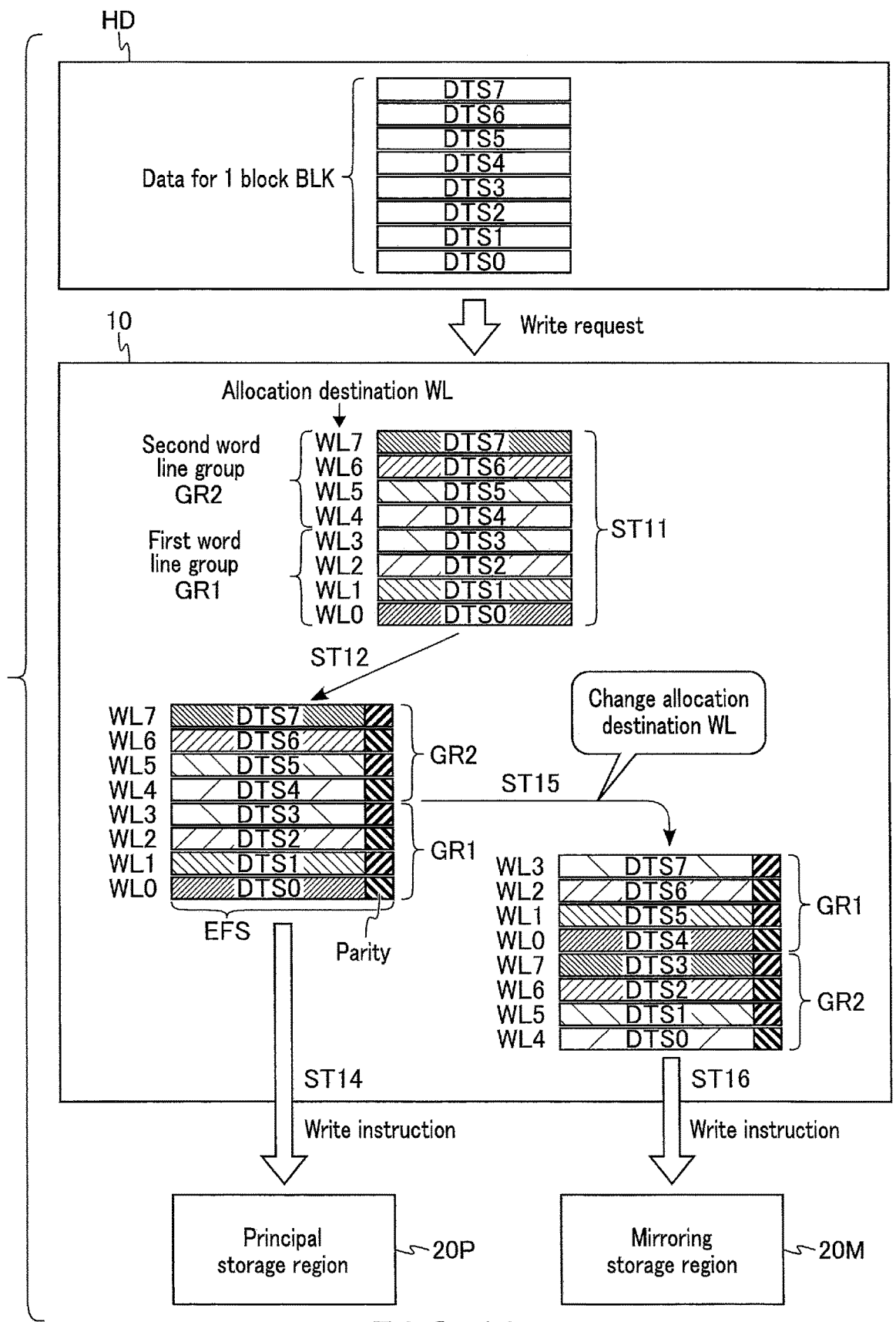
F I G. 14

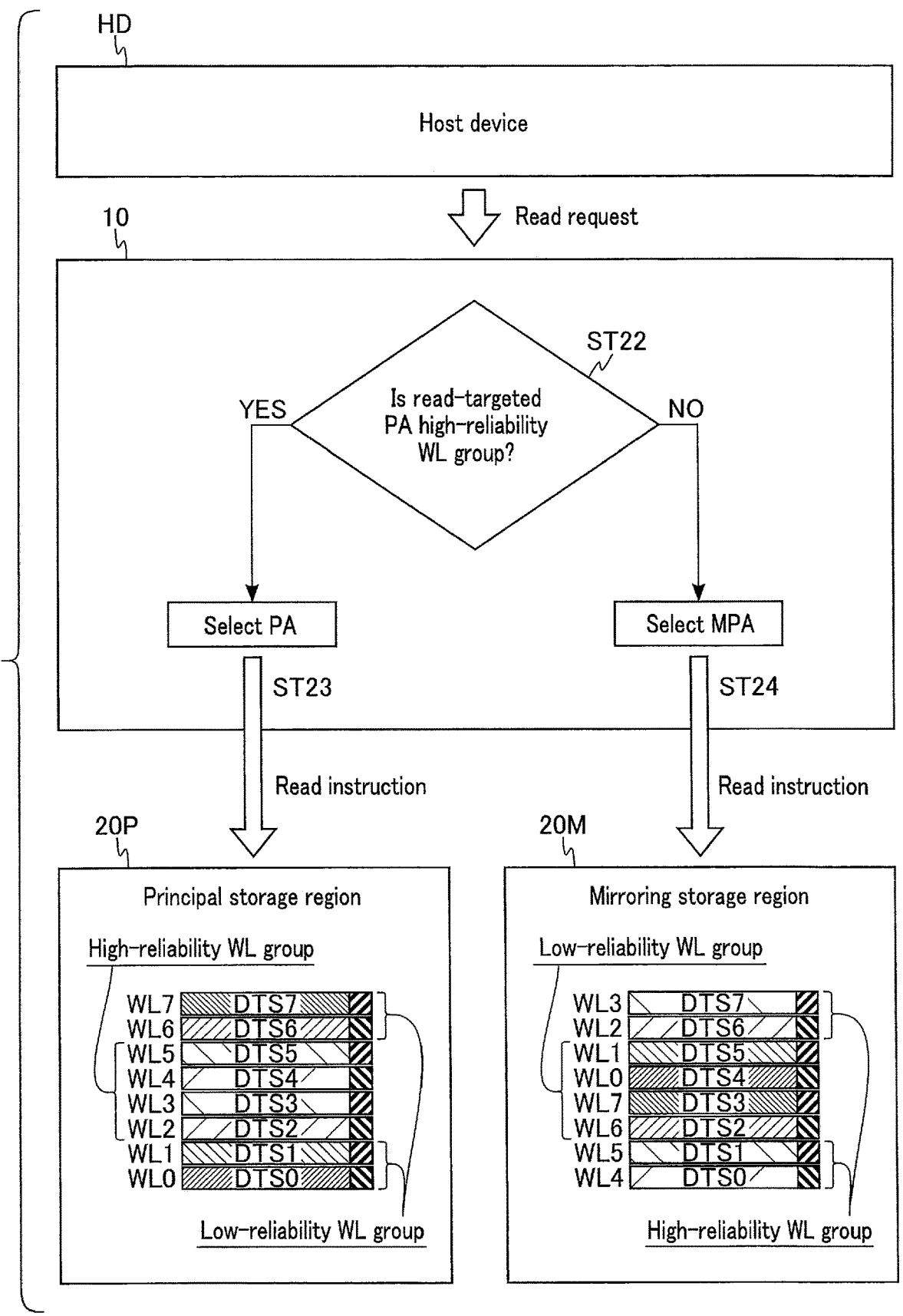
F I G. 15

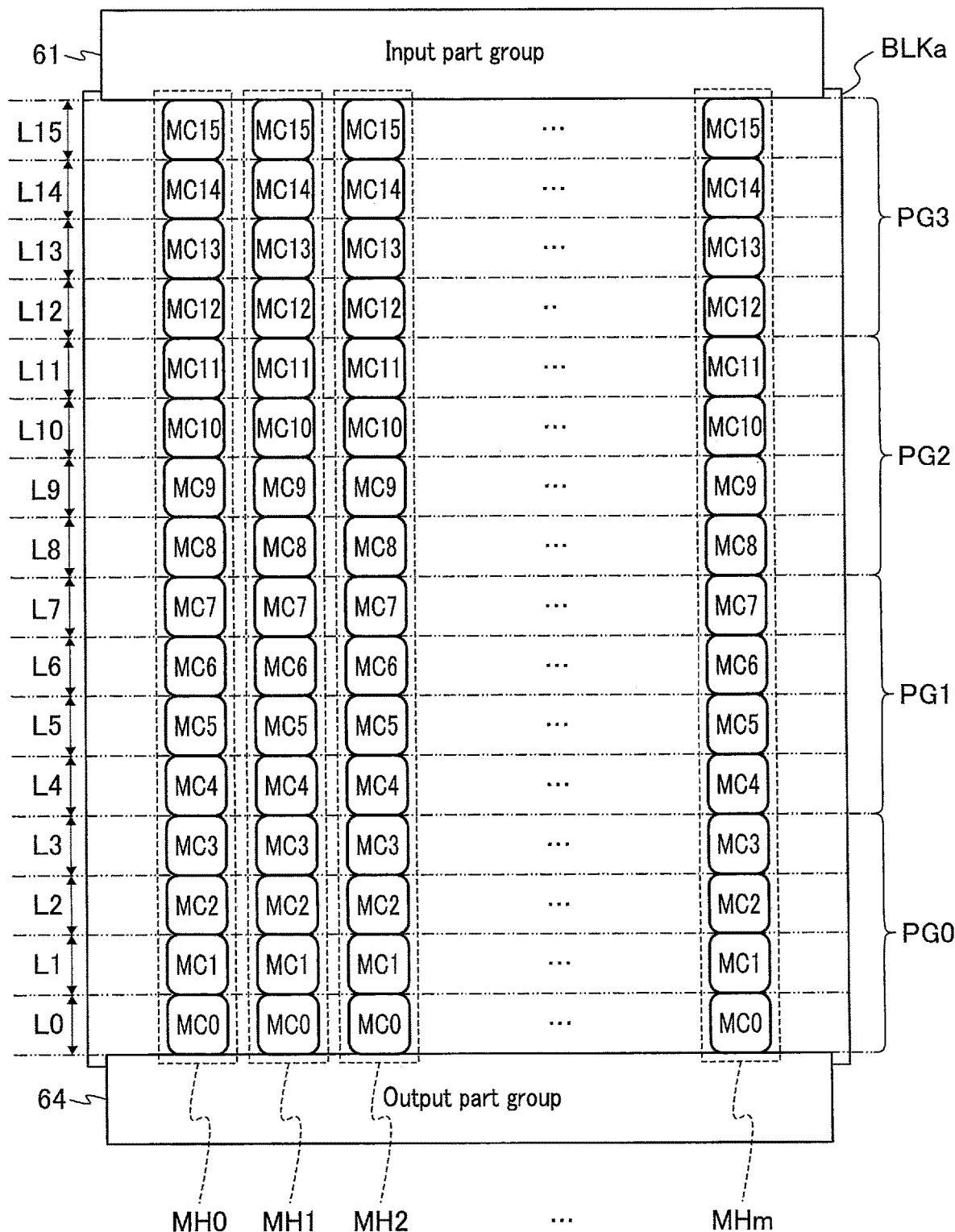
F I G. 18

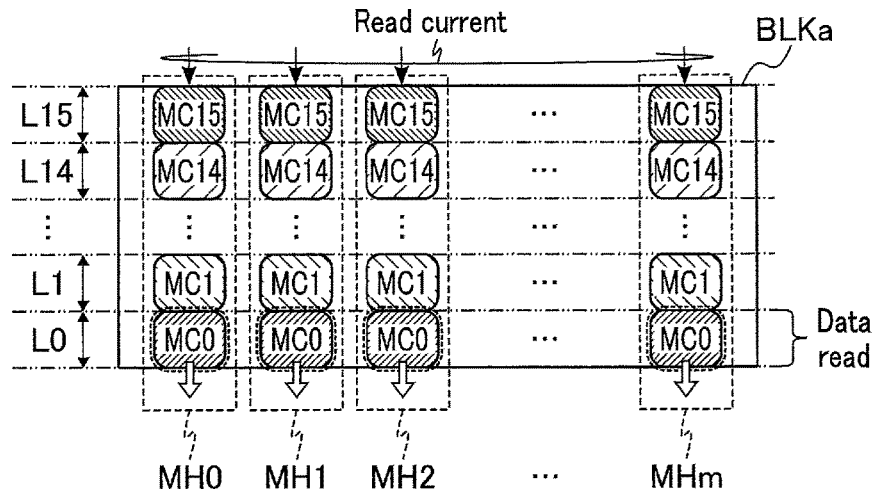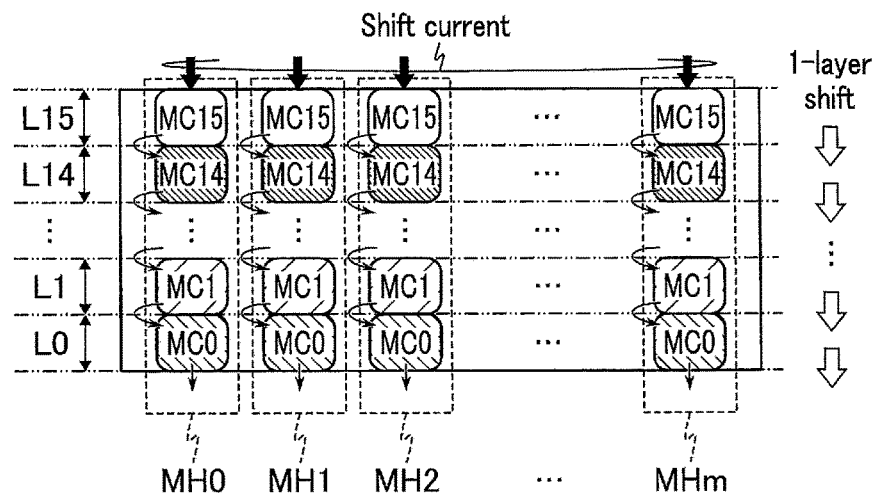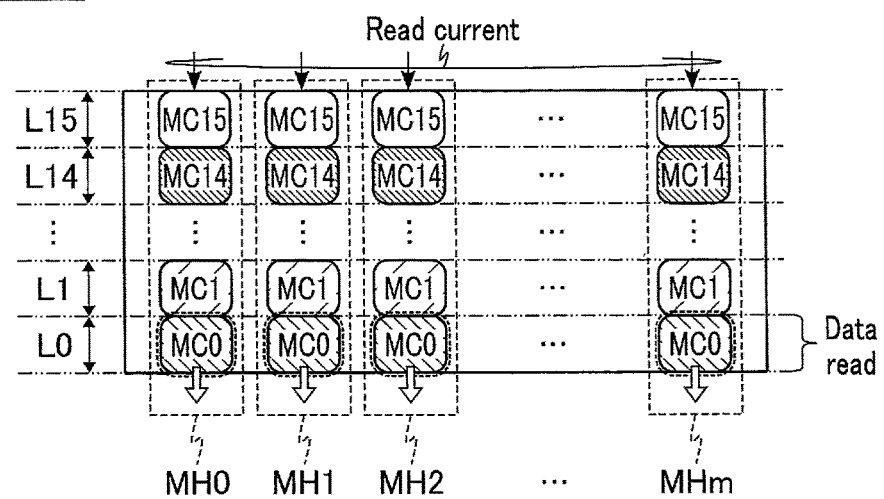
F I G. 20

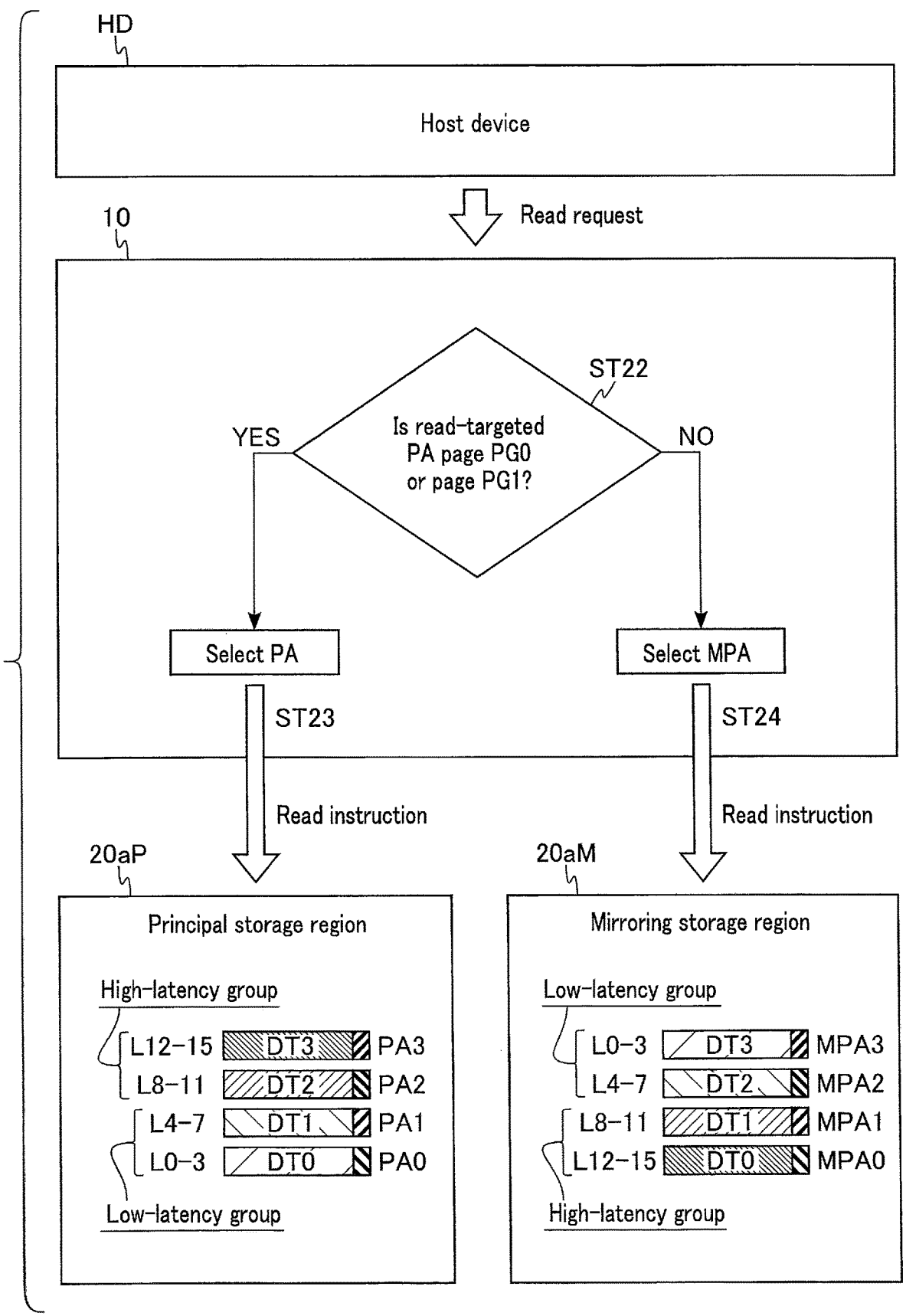
F I G. 22

|  | Number of shifts ||
| --- | --- | --- |
|  | Principal storage region 20aP | Mirroring storage region 20aM |
| PG0 read | 4 | 16 |
| PG1 read | 8 | 12 |
| PG2 read | 12 | 8 |
| PG3 read | 16 | 4 |

Addresses selected in read

F I G. 23

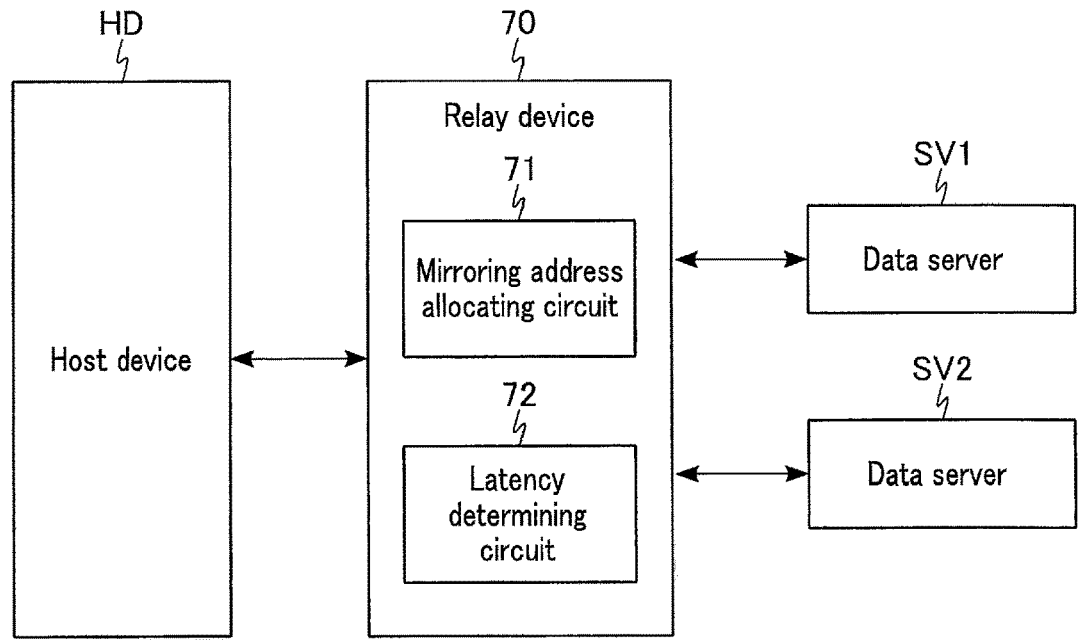
F I G. 24
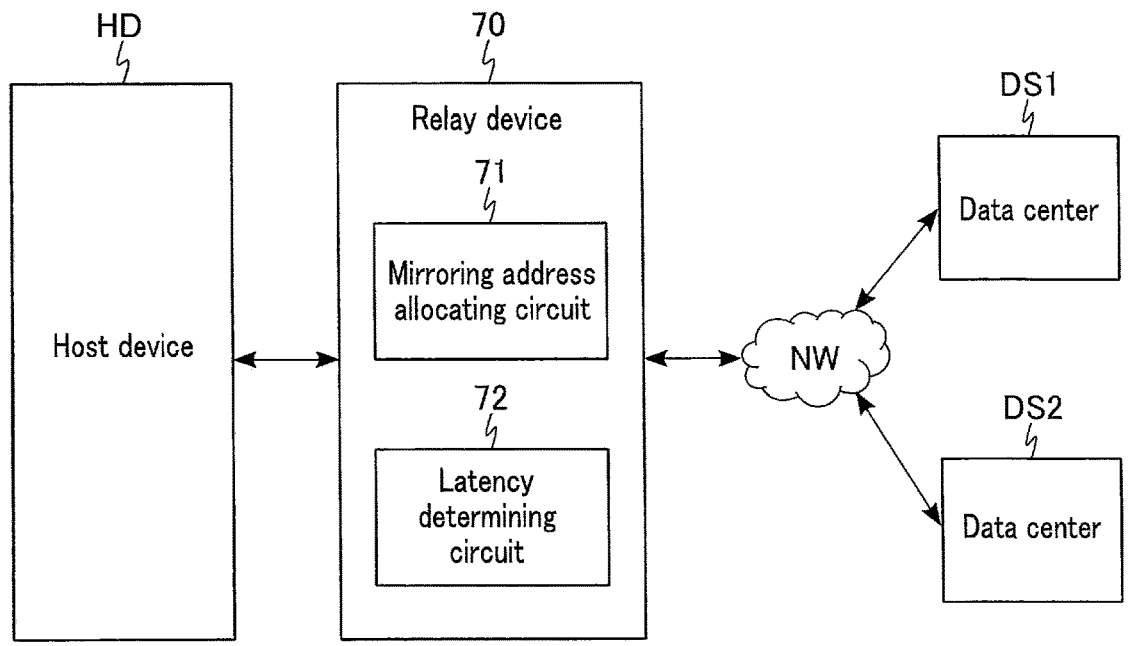
F I G. 25

MEMORY CONTROLLER, MEMORY SYSTEM, AND INFORMATION PROCESSING SYSTEM

CROSS-REFERENCE TO RELATED APPLICATIONS

This application is based upon and claims the benefit of priority from Japanese Patent Application No. 2021-152058, filed Sep. 17, 2021, the entire contents of which are incorporated herein by reference.

FIELD

Embodiments described herein relate generally to a memory controller, a memory system, and an information processing system.

BACKGROUND

A mirroring technique is known as a type of data redundancy technique.

BRIEF DESCRIPTION OF THE DRAWINGS

FIG. 3 is a block diagram showing an example of a configuration of a memory device according to the first embodiment.
FIG. 4 is a circuit diagram showing an example of a circuit configuration of a memory cell array included in the memory device according to the first embodiment.
FIG. 13 is a table showing an example of the number of reads in the read operation of the memory system according to the first embodiment.
FIG. 14 is a schematic diagram showing a specific example of a write operation in a modification of the first embodiment.
FIG. 15 is a schematic diagram showing a specific example of a read operation in the modification of the first embodiment.
FIG. 18 is a block diagram showing an example of a configuration of a memory cell array included in the memory device according to the third embodiment.
FIG. 20 is a schematic diagram showing an example of a read operation of the shift register type non-volatile memory.
FIG. 22 is a schematic diagram showing a specific example of a read operation of the memory system according to the third embodiment.
FIG. 23 is a table showing an example of the number of shifts in the read operation of the memory system according to the third embodiment.
FIG. 24 is a block diagram showing an example of a configuration of an information processing system according to a first example of a fourth embodiment.
FIG. 25 is a block diagram showing an example of a configuration of an information processing system according to a second example of the fourth embodiment.

DETAILED DESCRIPTION

Figure 1:
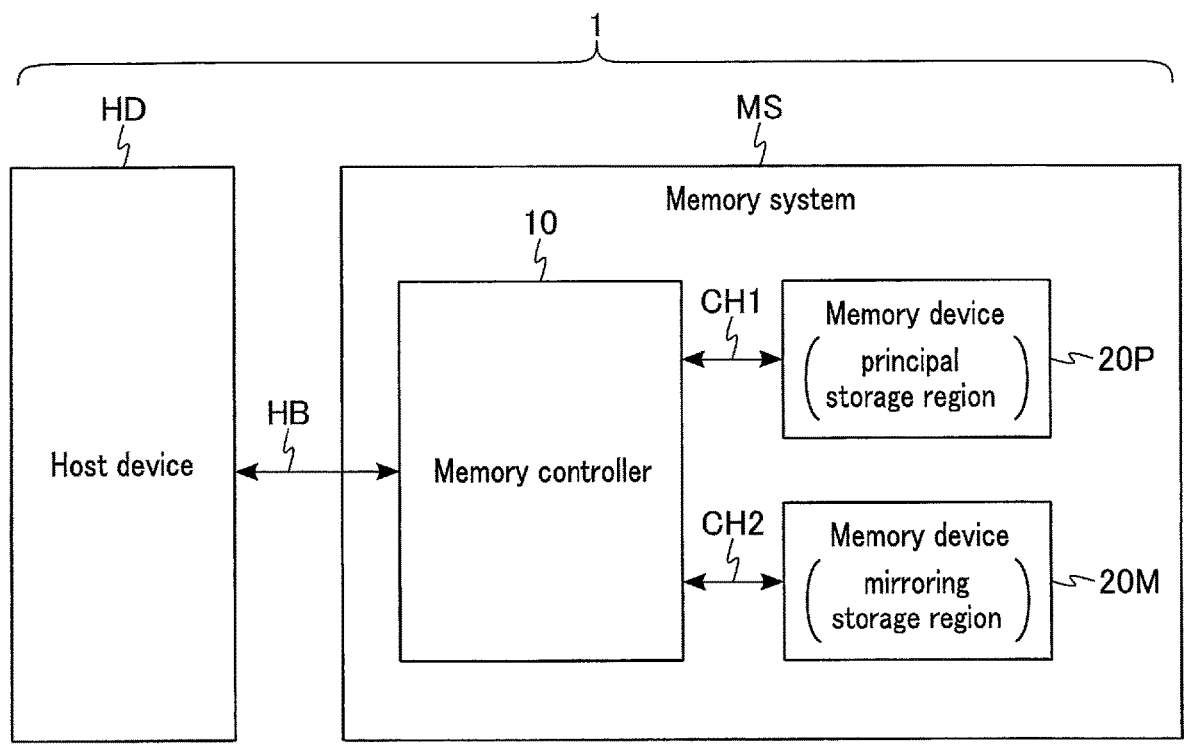
FIG. 1 is a block diagram showing an example of a configuration of an information processing system according to a first embodiment.

In general, according to one embodiment, a memory controller configured to control a first memory device and a second memory device. Each of the first memory device and the second memory device includes a plurality of memory cells. Each of the memory cells is configured to store a plurality of bits of data including a first bit and a second bit. The memory controller includes a control circuit. The control circuit is configured to duplicate and store data received from an external host device using the first memory device and the second memory device. The control circuit is configured to, when a write request specifying first data and a first logical address is received from the host device: i) allocate a first physical address corresponding to the first bit to the first logical address, and order the first memory device to write the first data to the first physical address; and ii) allocate a first mirroring physical address corresponding to the second bit to the first physical address, and order the second memory device to write the first data to the first mirroring physical address. A number of reads from the memory cell for reading the first bit is different from a number of reads from the memory cell for reading the second bit.

Hereinafter, embodiments will be described with reference to the drawings. Each embodiment exemplifies a device and a method for embodying a technical idea of the invention. The drawings are either schematic or conceptual. The dimensions, scales, etc. used in the drawings are not necessarily the same as those of the actual products. In the drawings, some structures are omitted as appropriate to enhance the visibility of the drawings. The hatching applied in the drawings does not necessarily relate to the material or characteristics of the hatched components. In the present specification, an "X direction", a "Y direction", and a "Z direction" correspond to directions intersecting one another. In addition, structural elements having substantially the same function and configuration will be denoted by the same reference sign. The numbers or letters added to the reference signs are used to distinguish between elements that are referenced by the same reference sign and have a similar configuration.

[1] First Embodiment

An information processing system 1 according to a first embodiment will be described below.

[1-1] Configuration

[1-1-1] Configuration of Information Processing System 1

FIG. 1 is a block diagram showing an example of a configuration of the information processing system 1 according to the first embodiment. As shown in FIG. 1, the information processing system 1 includes a host device HD and a memory system MS. The host device HD is an electronic device, such as a personal computer, a portable information terminal, and a server. The memory system MS is a semiconductor storage device, such as a memory card and a solid state drive (SSD). The memory system MS includes a memory controller 10 and memory devices 20P and 20M.

The memory controller 10 is, for example, a semiconductor integrated circuit formed as a SoC (System on a Chip). The memory controller 10 is coupled to the host device HD via a bus HB. The memory controller 10 controls each memory device 20 based on a request received from the host device HD. The memory controller 10 has a mirroring function of controlling the memory devices 20P and 20M via channels CH1 and CH2, respectively, and duplicating and storing data using the two memory devices 20P and 20M.

The memory device 20 is a storage device which stores data in a non-volatile manner. In the first embodiment, descriptions will be given of a case in which the memory device 20 is a NAND flash memory as an example. The memory device 20P is used as a principal storage region by the memory controller 10. The memory device 20M is used as a mirroring storage region by the memory controller 10. Hereinafter, the memory device 20P may also be referred to as a "principal storage region 20P". The memory device 20M may also be referred to as a "mirroring storage region 20M". A unit by which data can be written in or read from the memory system MS is referred to as a "page".

[1-1-2] Configuration of Memory Controller 10

Figure 2:
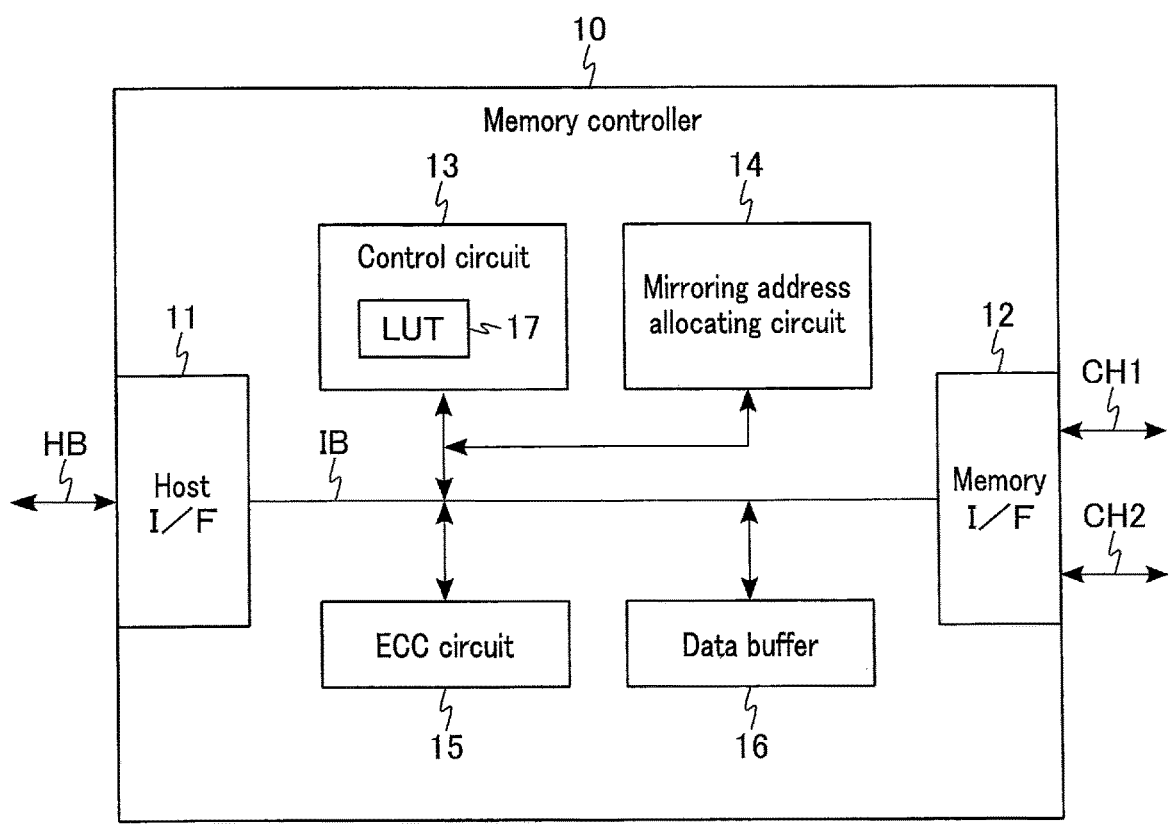
FIG. 2 is a block diagram showing an example of a configuration of a memory controller according to the first embodiment.

FIG. 2 is a block diagram showing an example of a configuration of the memory controller 10 according to the first embodiment. As shown in FIG. 2, the memory controller 10 includes, for example, a host interface (host I/F) 11, a memory interface (memory I/F) 12, a control circuit 13, a mirroring address allocating circuit 14, an ECC (Error Correction Code) circuit 15, a data buffer 16, and an internal bus IB.

The host I/F 11 is a hardware interface which performs communications in accordance with an interface standard between the host device HD and the memory controller 10. The host I/F 11 is coupled to the host device HD via the bus HB. The interface standard supported by the host I/F 11 is SATA (Serial Advanced Technology Attachment), PCIe™ (PCI Express), etc. The host I/F 11 outputs data, a request, etc. received from the host device HD to the internal bus IB. The host I/F 11 transmits data received from the memory device 20, a response generated by the control circuit 13, etc. to the host device HD.

The memory I/F 12 is a hardware interface which performs communications in accordance with an interface standard between the memory device 20 and the memory controller 10. The interface standard supported by the memory I/F 12 is, for example, a NAND interface standard. The memory I/F 12 is coupled to the memory device 20P (principal storage region) via the channel CH1, and coupled to the memory device 20M (mirroring storage region) via the channel CH2. The memory I/F 12 transmits data received from the host device HD, an instruction generated by the control circuit 13, etc. to the memory device 20. The memory I/F 12 outputs data and a response received from the memory device 20, etc. to the internal bus IB.

The control circuit 13 includes a CPU (Central Processing Unit), a ROM (Read Only Memory), a RAM (Random Access Memory), etc., and collectively controls each structural element of the memory controller 10. For example, an operation of the memory controller 10 is realized by the CPU executing firmware stored in the ROM. The RAM is a volatile memory used as a working area of the CPU, and stores a lookup table (LUT) 17. The LUT 17 is a management table that associates a logical address LA of a page with a physical address PA of the page, and is a type of system data of the memory system MS. The LUT 17 may also be referred to as an "address conversion table" or a "logical address/physical address conversion table". The host device HD designates a logical address LA, and requests data write/read to the memory controller 10. When a write request is received from the host device HD, the control circuit 13 allocates a physical address PA of a data write destination to a logical address LA received from the host device HD, and records the allocated physical address PA in the LUT 17. Then, the control circuit 13 designates the physical address PA, and orders the memory device 20 to write the data. When a read request is received from the host device HD, the control circuit 13 converts the logical address LA received from the host device HD to the physical address PA using the LUT 17. Then, the control circuit 13 designates the physical address PA, and orders the memory device 20 to read the data.

The mirroring address allocating circuit 14 allocates a mirroring physical address MPA to the physical address PA. The "mirroring physical address MPA" indicates a physical address allocated to the mirroring storage region 20M. On the other hand, a physical address PA allocated to a logical address LA received from the host device HD indicates a physical address allocated to the principal storage region 20P. Note that the mirroring physical address MPA may be recorded in the LUT 17, or may be derived by calculation using a physical address PA. In the following, a case in which a mirroring physical address MPA referred to at the time of a read operation is acquired by calculation using a physical address PA will be described as an example.

The ECC circuit 15 is a circuit for executing ECC processing. The ECC processing includes encoding and decoding. Specifically, in a write operation, the ECC circuit 15 generates an ECC frame by encoding data received from the host device HD. The ECC frame is a unit of data encoded and decoded by the ECC circuit 15. The ECC frame is generated for each piece of 1-page data, and written in the memory device 20. The ECC frame includes an information portion and a redundant portion. The information portion is encoded data. The redundant portion is called an error correction code or parity. In a read operation, the ECC circuit 15 decodes the ECC frame read from the memory device 20. When decoding, the ECC circuit 15 corrects an error in the information portion of the read ECC frame using the parity of the read ECC frame. The encoding method of the ECC circuit 15 is BCH (Bose-Chaudhuri-Hocquenghem) encoding, RS (Reed-Solomon) encoding, LDPC (Low-Density Parity-Check) encoding, etc.

The data buffer 16 is a volatile memory, such as a DRAM (Dynamic Random Access Memory) and an SRAM (Static Random Access Memory). The data buffer 16 temporarily stores data received from the host device HD via the host I/F 11 and data received from the memory device 20 via the memory I/F 12. The data buffer 16 may temporarily store an ECC frame. The data buffer 16 may be externally coupled to the memory controller 10.

[1-1-3] Configuration of Memory Device 20

FIG. 3 is a block diagram showing an example of a configuration of the memory device 20 according to the first embodiment. As shown in FIG. 3, the memory device 20 includes, for example, a memory interface (memory I/F) 21, a sequencer 22, a memory cell array 23, a driver module 24, a row decoder module 25, and a sense amplifier module 26.

The memory I/F 21 is a hardware interface coupled to the memory controller 10 via a channel CH. The memory I/F 21 performs communications in accordance with an interface standard between the memory device 20 and the memory controller 10. The interface standard supported by the memory I/F 21 is, for example, a NAND interface standard.

The sequencer 22 is a control circuit which controls the overall operation of the memory device 20. The sequencer 22 controls the driver module 24, row decoder module 25, sense amplifier module 26, etc., based on a command received via the memory I/F 21, to perform a read operation, a write operation, an erase operation, etc.

The memory cell array 23 is a storage circuit including a set of a plurality of memory cells. The memory cell array 23 includes a plurality of blocks BLK0 to BLKn (n is an integer of 1 or more). The block BLK is used as a unit of data erasure, for example. In addition, the memory cell array 23 is provided with a plurality of bit lines and a plurality of word lines. Each memory cell is associated with, for example, a single bit line and a single word line. Each memory cell is identified based on an address that identifies a word line WL and an address that identifies a bit line BL.

The driver module 24 is a driver circuit which generates a voltage to be used in a read operation, a write operation, an erase operation, etc. The driver module 24 is coupled to the row decoder module 25 via a plurality of signal lines. The driver module 24 may change a voltage to be applied to each of the signal lines based on a page address received via the memory I/F 21.

The row decoder module 25 is a decoder which decodes a row address received via the memory I/F 21. The row decoder module 25 selects a row direction (one block BLK) of the memory cell array 23 based on a decoding result. Then, the row decoder module 25 respectively transfers the voltages applied to the signal lines to a plurality of interconnects (word lines WL, etc.) provided in the selected block BLK.

The sense amplifier module 26 is a sense circuit which senses data read from the selected block BLK based on a voltage of a bit line BL in a read operation. The sense amplifier module 26 transmits the read data to the memory controller 10 via the memory I/F 21. In addition, the sense amplifier module 26 may apply a voltage corresponding to data to be written in a memory cell MC to each bit line BL in a write operation.

[1-1-4] Circuit Configuration of Memory Cell Array 23

FIG. 4 is a circuit diagram showing an example of a circuit configuration of the memory cell array 23 included in the memory device 20 according to the first embodiment. FIG. 4 shows one block BLK of a plurality of blocks BLK included in the memory cell array 23. As shown in FIG. 4, the block BLK includes, for example, five string units SU0 to SU4.

Each string unit SU includes a plurality of NAND strings NS associated with respective bit lines BL0 to BLm (m is an integer of 1 or more). Each NAND string NS includes, for example, memory cell transistors MT0 to MT7, and select transistors STD and STS. Each memory cell transistor MT includes a control gate and a charge storage layer, and stores data in a non-volatile manner. Each of the select transistors STD and STS is used for selection of a string unit SU in a read operation and a write operation.

In each NAND string NS, the memory cell transistors MT0 to MT7 are coupled in series. The drain of the select transistor STD is coupled to an associated bit line BL. The source of the select transistor STD is coupled to one end of a set of memory cell transistors MT0 to MT7 coupled in series. The drain of the select transistor STS is coupled to the other end of the set of memory cell transistors MT0 to MT7 coupled in series. The source of the select transistor STS is coupled to a source line SL.

The control gates of the memory cell transistors MT0 to MT7 in the same block BLK are coupled in common to word lines WL0 to WL7, respectively. The gates of a plurality of select transistors STD in the string unit SU0 are coupled to a select gate line SGD0. The gates of a plurality of select transistors STD in the string unit SU1 are coupled to a select gate line SGD1. The gates of a plurality of select transistors STD in the string unit SU2 are coupled to a select gate line SGD2. The gates of a plurality of select transistors STD in the string unit SU3 are coupled to a select gate line SGD3. The gates of a plurality of select transistors STD in the string unit SU4 are coupled to a select gate line SGD4. The gates of a plurality of select transistors STS are coupled to a select gate line SGS.

Different column addresses are respectively assigned to the bit lines BL0 to BLm. Each bit line BL is shared by the NAND strings NS to which the same column address is assigned from among a plurality of blocks BLK. A set of the word lines WL0 to WL7 is provided for each block BLK. The source line SL is, for example, shared by a plurality of blocks BLK.

The circuit configuration of the memory cell array 23 is not limited to the above-described configuration. The number of string units SU included in each block BLK and the numbers of memory cell transistors MT and select transistors STD and STS included in each NAND string NS may be any number. In the present specification, a set of a plurality of memory cell transistors MT coupled to a common word line WL in a single string unit SU is called a "cell unit CU". The cell unit CU stores "1-page data" when each memory cell transistor MT stores 1-bit data. The cell unit CU may store 2-page data or more in accordance with the number of bits of data stored in the memory cell transistors MT.

[1-1-5] Structure of Memory Cell Array 23

An example of a structure of the memory cell array 23 included in the memory device 20 according to the first embodiment will be described below. In the memory cell array 23, an X direction corresponds to a direction in which the word lines WL extend, a Y direction corresponds to a direction in which the bit lines BL extend, and a Z direction corresponds to a vertical direction with respect to a surface of a semiconductor substrate 30 used for formation of the memory device 20.

(Planar Layout of Memory Cell Array 23)

Figure 5:
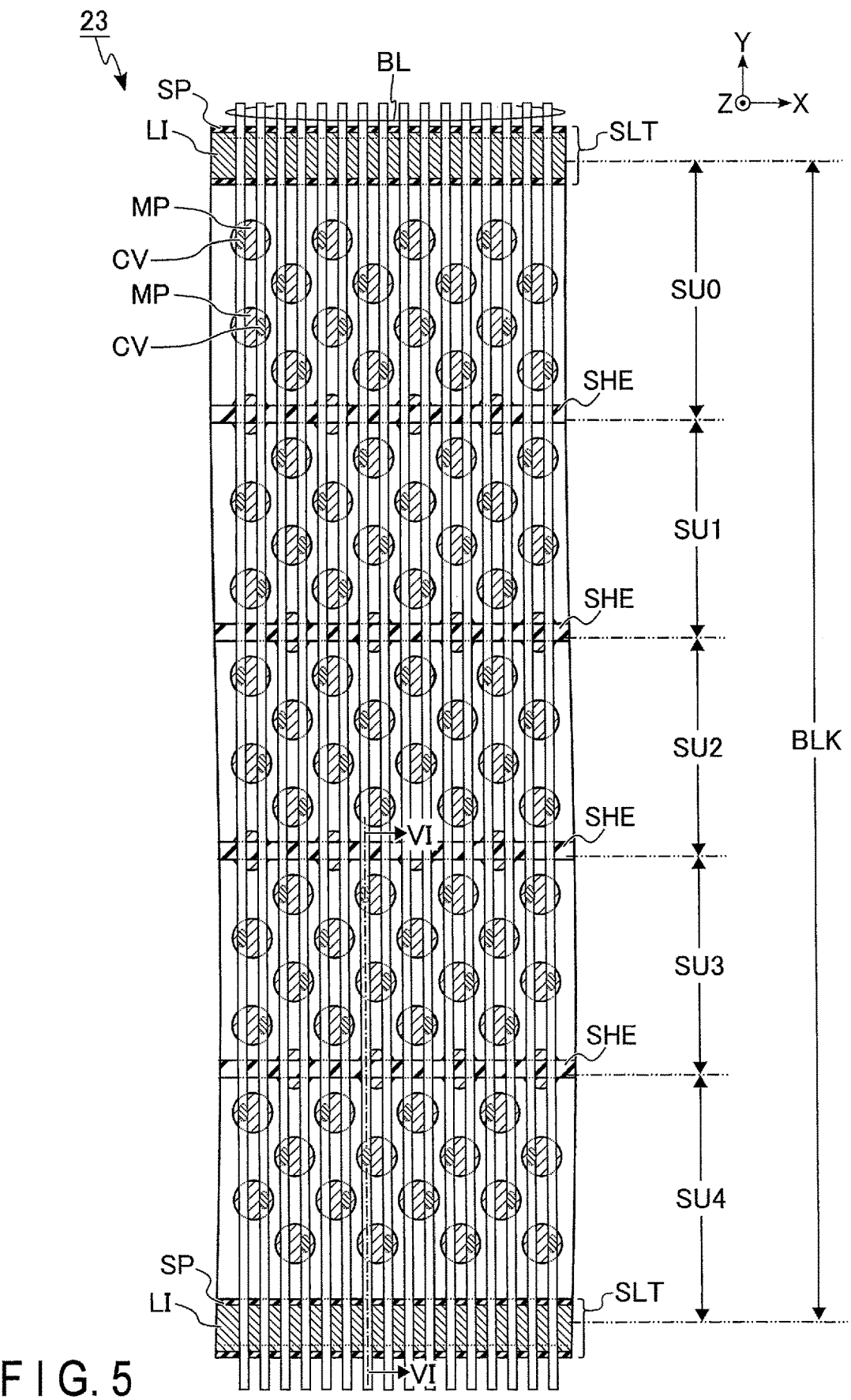
FIG. 5 is a plan view showing an example of a planar layout of the memory cell array included in the memory device according to the first embodiment.

FIG. 5 is a plan view showing an example of a planar layout of the memory cell array 23 included in the memory device 20 according to the first embodiment. FIG. 5 shows an area including one block BLK (i.e., string units SU0 to SU4). As shown in FIG. 5, the memory cell array 23 includes, for example, a plurality of slits SLT, a plurality of slits SHE, a plurality of memory pillars MP, a plurality of bit lines BL, and a plurality of contacts CV.

Each slit SLT is a member including a portion that extends along the X direction. The slits SLT are aligned in the Y direction. Each of the areas sectioned by the slits SLT corresponds to one block BLK. Each slit SLT divides interconnects (e.g., the word lines WL0 to WL7 and the select gate lines SGD and SGS) that are adjacent to each other in the Y direction. In addition, each slit SLT includes a contact LI and a spacer SP. The contact LI is a conductor including a portion that extends along the X direction. The contact LI is used as a part of the source line SL. The spacer SP is an insulator provided on a side surface of the contact LI. The contact LI is sandwiched between a set of spacers SP in the Y direction. The contact LI and a conductor adjacent to the contact LI in the Y direction are distanced and insulated by the spacer SP.

Each slit SHE is a member including a portion that extends along the X direction. The slits SHE are aligned in the Y direction. In the memory cell array 23, each of the areas sectioned by the slits SLT and SHE corresponds to one string unit SU. In the present example, four slits SHE are arranged between two adjacent slits SLT, and each block BLK has five string units SU. Each slit SHE has a structure into which an insulator is embedded, for example. Each slit SHE divides interconnects (at least the select gate lines SGD) that are adjacent to each other in the Y direction.

Each memory pillar MP functions as one NAND string NS. A plurality of memory pillars MP are in, for example, a 24-row staggered arrangement in an area between two adjacent slits SLT. Then, in the present example, a single slit SHE overlaps each set of the memory pillars MP in the fifth row, the tenth row, the fifteenth row, and the twentieth row, counting from the upper side of the drawing.

Each bit line BL includes a portion that extends along the Y direction. A plurality of bit lines are aligned in the X direction. Each bit line BL is arranged so as to overlap at least one memory pillar MP for each string unit SU. In the present example, two bit lines BL overlap each memory pillar MP. A contact CV is provided between a memory pillar MP and one of the bit lines BL that overlap the memory pillar MP. Each memory pillar MP is electrically coupled to a corresponding bit line BL by way of an associated contact CV. In the present example, a contact CV is omitted between a memory pillar MP in contact with a slit SHE and a bit line BL.

In the memory cell array 23, the layout described above is repeatedly arranged in the Y direction. Note that the planar layout of the memory cell array 23 may be other layouts. For example, the number and arrangement of memory pillars MP, slits SHE, etc. provided between any adjacent slits SLT may be changed as appropriate. The number of string units SU formed between any adjacent slits SLT may be changed based on the number of slits SHE arranged between the adjacent slits SLT. The number of bit lines BL that overlap each memory pillar MP may be one, or three or more.

(Cross-Sectional Structure of Memory Cell Array 23)

Figure 6:
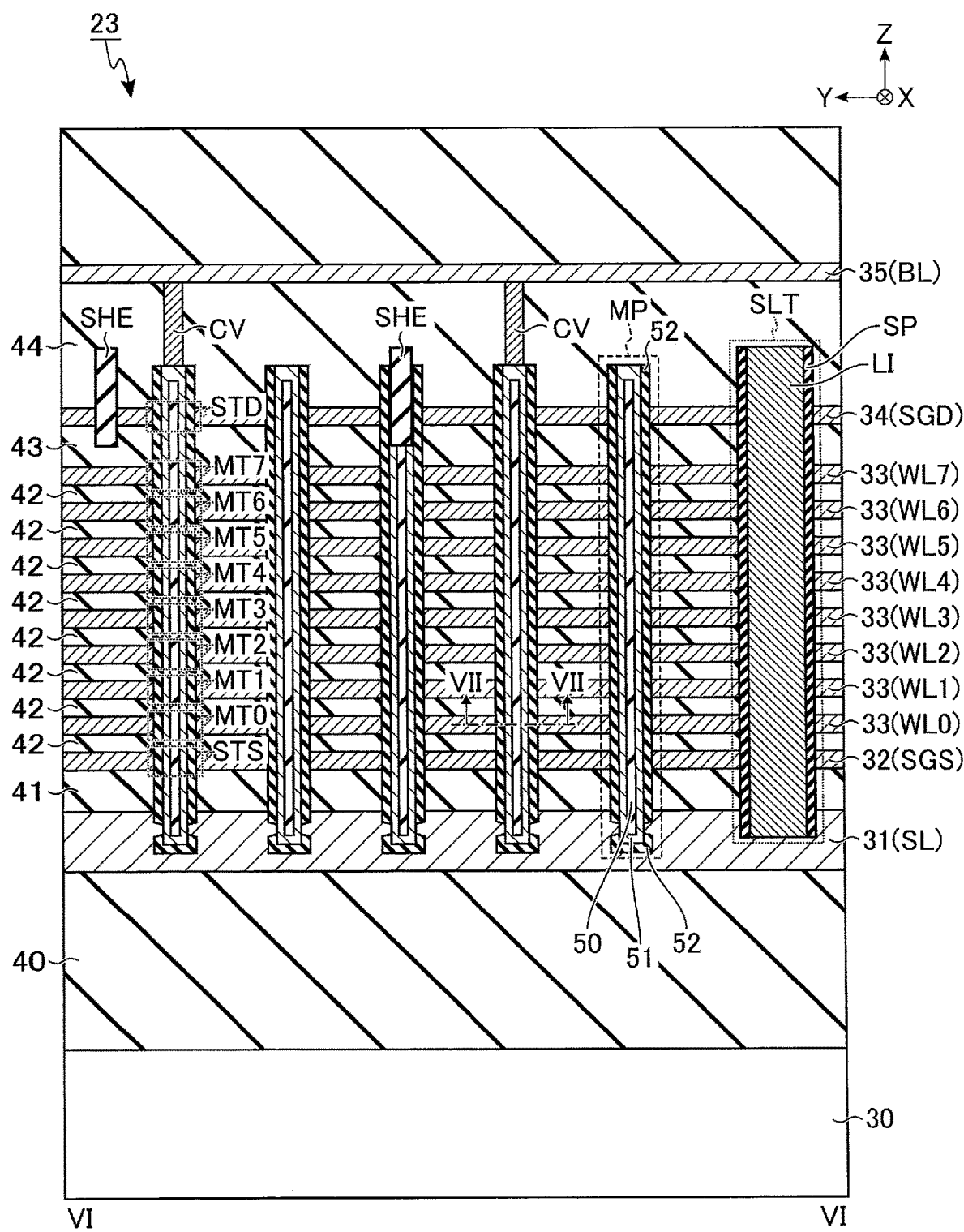
FIG. 6 is a cross-sectional view taken along line VI-VI in FIG. 5, showing an example of a cross-sectional structure of the memory cell array included in the memory device according to the first embodiment.

FIG. 6 is a cross-sectional view taken along line VI-VI in FIG. 5, showing an example of a cross-sectional structure of the memory cell array 23 included in the memory device 20 according to the first embodiment. As shown in FIG. 6, the memory device 20 includes, for example, a semiconductor substrate 30, conductive layers 31 to 35, and insulating layers 40 to 44.

The semiconductor substrate 30 is, for example, a P-type semiconductor substrate. The insulating layer 40 is provided on the semiconductor substrate 30. The insulating layer 40 covers a circuit coupled to the row decoder module 25, the sense amplifier module 26, etc. formed on the semiconductor substrate 30, and may be formed of a plurality of layers. The conductive layer 31 is provided on the insulating layer 40. The insulating layer 41 is provided on the conductive layer 31. The conductive layers 32 and insulating layers 42 are alternately stacked on the insulating layer 41. The insulating layer 43 is provided on the uppermost conductive layer 33. The conductive layer 34 is provided on the insulating layer 43. The insulating layer 44 is provided on the conductive layer 34. The conductive layer 35 is provided on the insulating layer 44.

Each of the conductive layers 32, 33, and 34 is formed in a plate-like shape expanding along the XY plane. The conductive layer 35 is, for example, formed in a linear shape extending in the Y direction. The conductive layer 31 is used as the source line SL. The conductive layer 32 is used as a select gate line SGS. Eight stacked conductive layers 33 are used as word lines WL0 to WL7, respectively, in order from the lower layer side. The conductive layer 34 is used as a select gate line SGD. The conductive layer 35 is used as a bit line BL. A plurality of conductive layers 35 are aligned along the X direction in an area that is not shown in the drawing. Each of the conductive layers 32, 33, and 34 contains, for example, tungsten. The conductive layer 35 contains, for example, copper.

Each memory pillar MP extends along the Z direction, and penetrates the insulating layers 41 to 43 and the conductive layers 32 to 34. A bottom portion of the memory pillar MP reaches the conductive layer 31. A portion at which the memory pillar MP and the conductive layer 32 intersect each other functions as a select transistor STS. A portion at which the memory pillar MP and one conductive layer 33 intersect each other functions as one memory cell transistor MT. A portion at which the memory pillar MP and the conductive layer 34 intersect each other functions as a select transistor STD.

Further, each memory pillar MP includes, for example, a core member 50, a semiconductor layer 51, and a stacked film 52. The core member 50 extends along the Z direction. A top end of the core member 50 is included in a layer above the conductive layer 34. A lower end of the core member 50 is included in an interconnect provided with the conductive layer 31. The semiconductor layer 51 surrounds the core member 50. Part of the semiconductor layer 51 is in contact with the conductive layer 31 via a side surface of the memory pillar MP. The stacked film 52 covers the side and bottom surfaces of the semiconductor layer 51, excluding the portion where the semiconductor layer 51 is in contact with the conductive layer 31. The core member 50 contains an insulator. The semiconductor layer 51 contains, for example, silicon.

A columnar contact CV is provided on the semiconductor layer 51 in the memory pillar MP. In the illustrated area, two contacts CV, respectively corresponding to two of the five memory pillars MP, are shown. A top surface of the contact CV is in contact with one conductive layer 35. In each space sectioned by the slits SLT and SHE, one contact CV is coupled to the single conductive layer 35.

The slit SLT includes a portion provided along the XZ plane, and divides the conductive layers 32 to 34 and the insulating layers 41 to 43. In the slit SLT, the contact LI is provided along the slit SLT. A lower end of the contact LI is in contact with the conductive layer 31. The contact LI is used as a part of the source line SL. The spacer SP is provided at least between the contact LI and the conductive layers 32 to 34. By the presence of the spacers SP, the contact LI is distanced and insulated from the conductive layers 32 to 34. The slit SHE includes a portion provided along the XZ plane, and divides at least the conductive layer 34.

(Cross-Sectional Structure of Memory Pillar MP)

Figure 7:
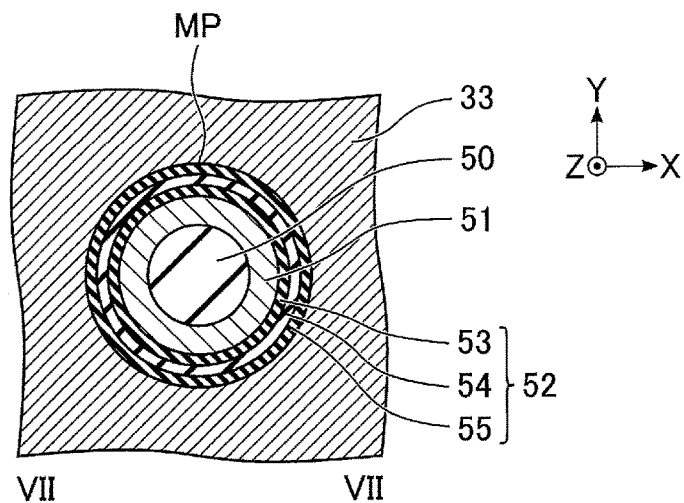
FIG. 7 is a cross-sectional view taken along line VII-VII in FIG. 6, showing an example of a cross-sectional structure of a memory pillar included in the memory device according to the first embodiment.

FIG. 7 is a cross-sectional view taken along line VII-VII in FIG. 6, showing an example of a cross-sectional structure of a memory pillar MP included in the memory device 20 according to the first embodiment. FIG. 7 shows a cross-sectional structure of the memory pillar MP in a layer that is parallel to the surface of the semiconductor substrate 30 and includes the conductive layer 33. As shown in FIG. 7, the stacked film 52 includes, for example, a tunnel insulating film 53, an insulating film 54, and a block insulating film 55.

In the cross section including the conductive layer 33, the core member 50 is provided in the middle of the memory pillar MP. The semiconductor layer 51 surrounds a side surface of the core member 50. The tunnel insulating film 53 surrounds a side surface of the semiconductor layer 51. The insulating film 54 surrounds a side surface of the tunnel insulating film 53. The block insulating film 55 surrounds a side surface of the insulating film 54. The conductive layer 33 surrounds a side surface of the block insulating film 55. Each of the tunnel insulating film 53 and the block insulating film 55 contains, for example, silicon oxide. The insulating film 54 contains, for example, silicon nitride.

In the above-described memory pillar MP, the semiconductor layer 51 is used as a channel (current path) for the memory cell transistors MT0 to MT7 and the select transistors STD and STS. The insulating film 54 is used as a charge storage layer of the memory cell transistors MT. The memory device 20 can pass an electric current through the memory pillar MP between the bit line EL and the contact LI by turning on the memory cell transistors MT0 to MT7 and the select transistors STD and STS.

[1-1-6] Data Allocation

Figure 8:
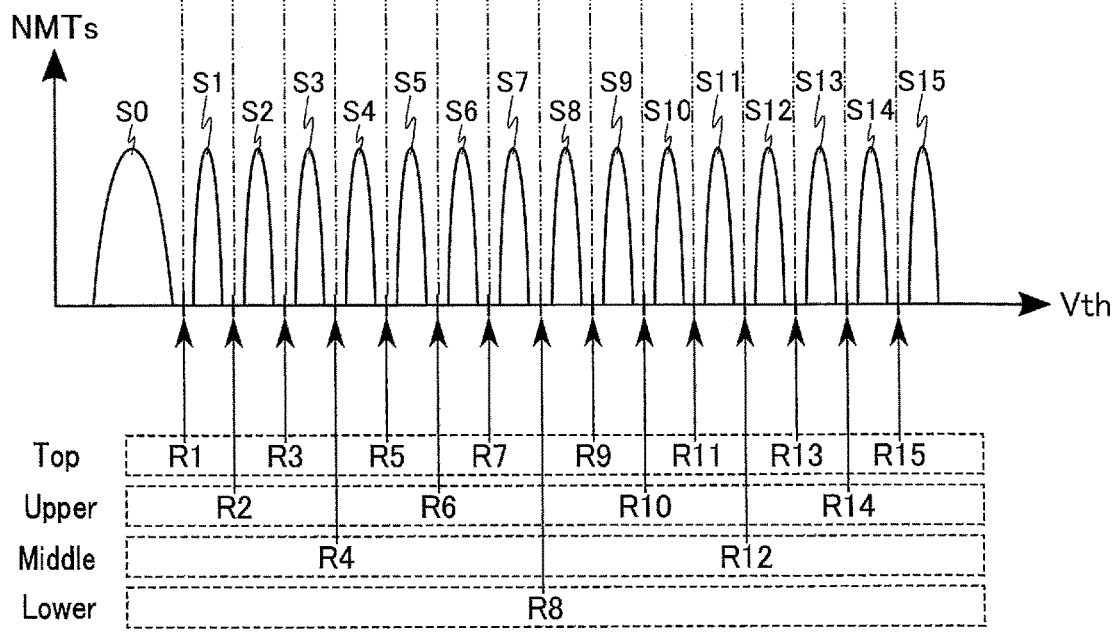
FIG. 8 is a schematic diagram showing an example of threshold voltage distributions of memory cell transistors and data allocation in the memory system according to the first embodiment.

FIG. 8 is a schematic diagram showing an example of threshold voltage distributions of memory cell transistors MT and data allocation in the memory system MS according to the first embodiment. The label "NMTs" in the vertical axis indicates the number of memory cell transistors MT.

The label "Vth" in the horizontal axis indicates the threshold voltage of the memory cell transistors MT. As shown in FIG. 8, when each memory cell transistor MT stores 4-bit data, i.e., when one cell unit CU stores 4-page data, the threshold voltage distribution of the memory cell transistors MT has sixteen types of states. In the present specification, these sixteen types of states are referred to as "S0", "S1", "S2", "S3", "S4", "S5", "S6", "S7", "S8", "S9", "S10", "S11", "S12", "S13", "S14", and "S15" states, from lower to higher threshold voltages. Different 4-bit data is allocated to each of the "S0" to "S15" states. An example of data allocation to each of the "S0" to "S15" states is listed below.

(Ex) State name: "top bit/upper bit/middle bit/lower bit" data
"S0" state: "1111" data
"S1" state: "0111" data
"S2" state: "0011" data
"S3" state: "1011" data
"S4" state: "1001" data
"S5" state: "0001" data
"S6" state: "0101" data
"S7" state: "1101" data
"S8" state: "1100" data
"S9" state: "0100" data
"S10" state: "0000" data
"S11" state: "1000" data
"S12" state: "1010" data
"S13" state: "0010" data
"S14" state: "0110" data
"S15" state: "1110" data A read voltage is set between neighboring states. Specifically, a read voltage R1 is set between the "S0" and "S1" states. A read voltage R2 is set between the "S1" and "S2" states. A read voltage R3 is set between the "S2" and "S3" states. A read voltage R4 is set between the "S3" and "S4" states. A read voltage R5 is set between the "S4" and "S5" states. A read voltage R6 is set between the "S5" and "S6" states. A read voltage R7 is set between the "S6" and "S7" states. A read voltage R8 is set between the "S7" and "S8" states. A read voltage R9 is set between the "S8" and "S9" states. A read voltage R10 is set between the "S9" and "S10" states. A read voltage R11 is set between the "S10" and "S11" states. A read voltage R12 is set between the "S11" and "S12" states. A read voltage R13 is set between the "S12" and "S13" states. A read voltage R14 is set between the "S13" and "S14" states. A read voltage R15 is set between the "S14" and "S15" states.

1-page data (lower-page data) constituted by lower bits is confirmed by a single read using the read voltage R8. That is, lower-page data is confirmed by one read voltage among the read voltage R1 to the read voltage R15, and the number of reads in a read of the lower-page data is one. 1-page data (middle-page data) constituted by middle bits is confirmed by two reads using the read voltages R4 and R12. That is, middle-page data is confirmed by two read voltages among the read voltage R1 to the read voltage R15, and the number of reads in a read of the middle-page data is two. 1-page data (upper-page data) constituted by upper bits is confirmed by four reads using the read voltages R2, R6, R10, and R14. That is, upper-page data is confirmed by four read voltages among the read voltage R1 to the read voltage R15, and the number of reads in a read of the upper-page data is four. 1-page data (top-page data) constituted by top bits is confirmed by eight reads using the read voltages R1, R3, R5, R7, R9, R11, R13, and R15. That is, top-page data is confirmed by eight read voltages among the read voltage R1 to the read voltage R15, and the number of reads in a read of the top-page data is eight. Hereinafter, a read operation for lower-page data will be referred to as a "lower read". A read operation for middle-page data will be referred to as a "middle read". A read operation for upper-page data will be referred to as an "upper read". A read operation for top-page data will be referred to as a "top read".

Since the number of reads in lower/middle/upper/top reads is one/two/four/eight, respectively, the above-described data allocation is called "1-2-4-8 coding", for example. In the data allocation used in the memory system MS according to the first embodiment, multiple-page data that one cell unit CU stores is classified into a group with a small number of reads and a group with a large number of reads. In the present example, the lower and middle pages correspond to the group with a small number of reads, and the upper and top pages correspond to the group with a large number of reads. As described above, the memory system MS according to the first embodiment employs data allocation with a bias in the number of reads per page.

Note that other allocations of data may be used in a case where the memory cell transistor MT stores 4-bit data. Further, an operation of the memory system MS to be described later is applicable to a case in which each memory cell transistor MT stores 2-bit, 3-bit, or 5 or more-bit data and there is a bias in the number of reads per page.

[1-2] Operation

[1-2-1] Write Operation

Figure 9:
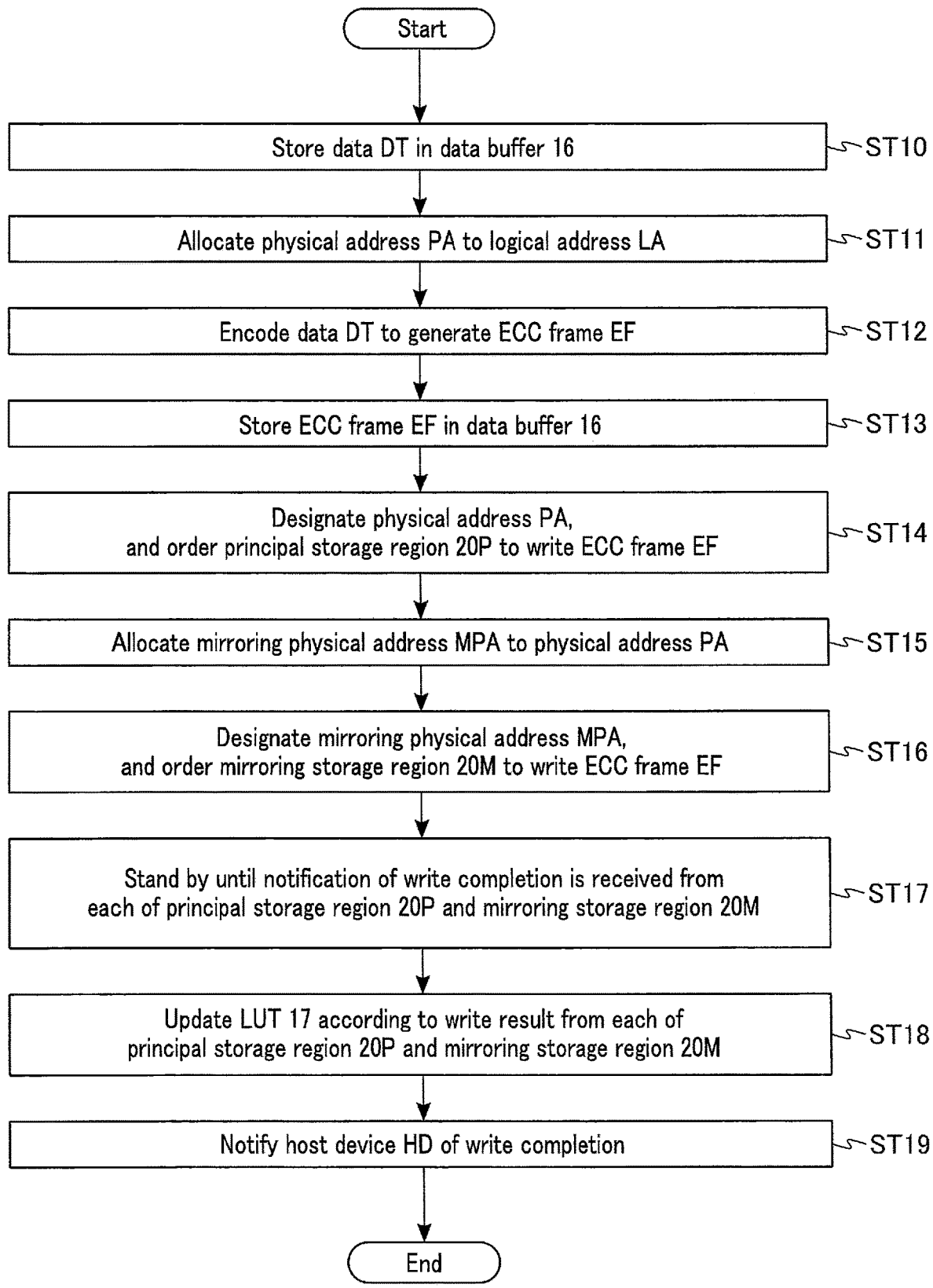
FIG. 9 is a flowchart showing an example of a write operation of the memory system according to the first embodiment.

FIG. 9 is a flowchart showing an example of a write operation of the memory system MS according to the first embodiment. In the following, the write operation of the memory system MS according to the first embodiment will be described with reference to FIG. 9, focusing on the operation of the memory controller 10.

When receiving data DT and a write request from the host device HD via the host I/F 11, the control circuit 13 of the memory controller 10 starts a series of processing in FIG. 9 (Start). In the present example, the "data DT" is 1-page data. The write request includes a logical address LA that designates a write destination of the data DT.

First, the control circuit 13 stores the data DT in the data buffer 16 (ST10).

Next, the control circuit 13 allocates a physical address PA to the logical address LA (ST11). In other words, the control circuit 13 allocates an unused physical address PA to the logical address LA based on the LUT 17.

Next, the control circuit 13 encodes the data DT to generate an ECC frame EF (ST12). The control circuit 13 uses the ECC circuit 15 for encoding of the data DT. The ECC frame EF includes the data DT and parity generated based on the data DT.

Next, the control circuit 13 stores the ECC frame EF in the data buffer 16 (ST13).

Then, the control circuit 13 designates a physical address PA and orders the principal storage region 20P to write the ECC frame EF (ST14). Specifically, the control circuit 13 transmits the ECC frame EF, the physical address PA, and the write instruction to the principal storage region 20P via the memory I/F 12. In the present embodiment, the write instruction is, for example, a write command. The principal storage region 20P which has received the ECC frame EF, physical address PA, and write instruction then starts the write of the ECC frame EF, with the physical address PA as a target.

Next, the control circuit 13 allocates a mirroring physical address MPA to the physical address PA (ST15). The control circuit 13 uses the mirroring address allocating circuit 14 for allocation of the mirroring physical address MPA. In the first embodiment, a page to which a mirroring physical address MPA is allocated is different from a page to which a physical address PA is allocated. Specifically, the mirroring address allocating circuit 14, in a case where a page corresponding to a physical address PA is included in a group with a small number of reads, allocates a mirroring physical address MPA to any one of the pages included in a group with a large number of reads. On the other hand, the mirroring address allocating circuit 14, in a case where a page corresponding to a physical address PA is included in the group with a large number of reads, allocates a mirroring physical address MPA to any one of the pages included in the group with a small number of reads. A specific example of the operation of the mirroring address allocating circuit will be described later.

Next, the control circuit 13 designates a mirroring physical address MPA, and orders the mirroring storage region 20M to write the ECC frame EF (ST16). Specifically, the control circuit 13 transmits the ECC frame EF, mirroring physical address MPA, and write instruction to the mirroring storage region 20M via the memory I/F 12. The mirroring storage region 20M which has received the ECC frame EF, mirroring physical address MPA, and write instruction then starts a write of the ECC frame EF, with the mirroring physical address MPA as a target. Note that the process of ST14 and the processes of ST15 and ST16 may be executed in parallel.

Next, the control circuit 13 stands by until receiving a notification of a write completion from the principal storage region 20P and a notification of a write completion from the mirroring storage region 20M (ST17).

Next, the control circuit 13 updates the LUT 17 according to a result of a write of each of the principal storage region 20P and the mirroring storage region 20M (ST18). That is, the control circuit 13 stores a physical address PA that has succeeded in the write by the processes of ST14 and ST16 in the LUT 17 in association with a logical address LA.

Next, the control circuit 13 notifies the host device HD of a write completion (ST19).

After the process of ST19, the control circuit 13 discards the ECC frame EF stored in the data buffer 16, and ends the series of processing in FIG. 9 (End).

(Specific Example of Write Operation)

Figure 10:
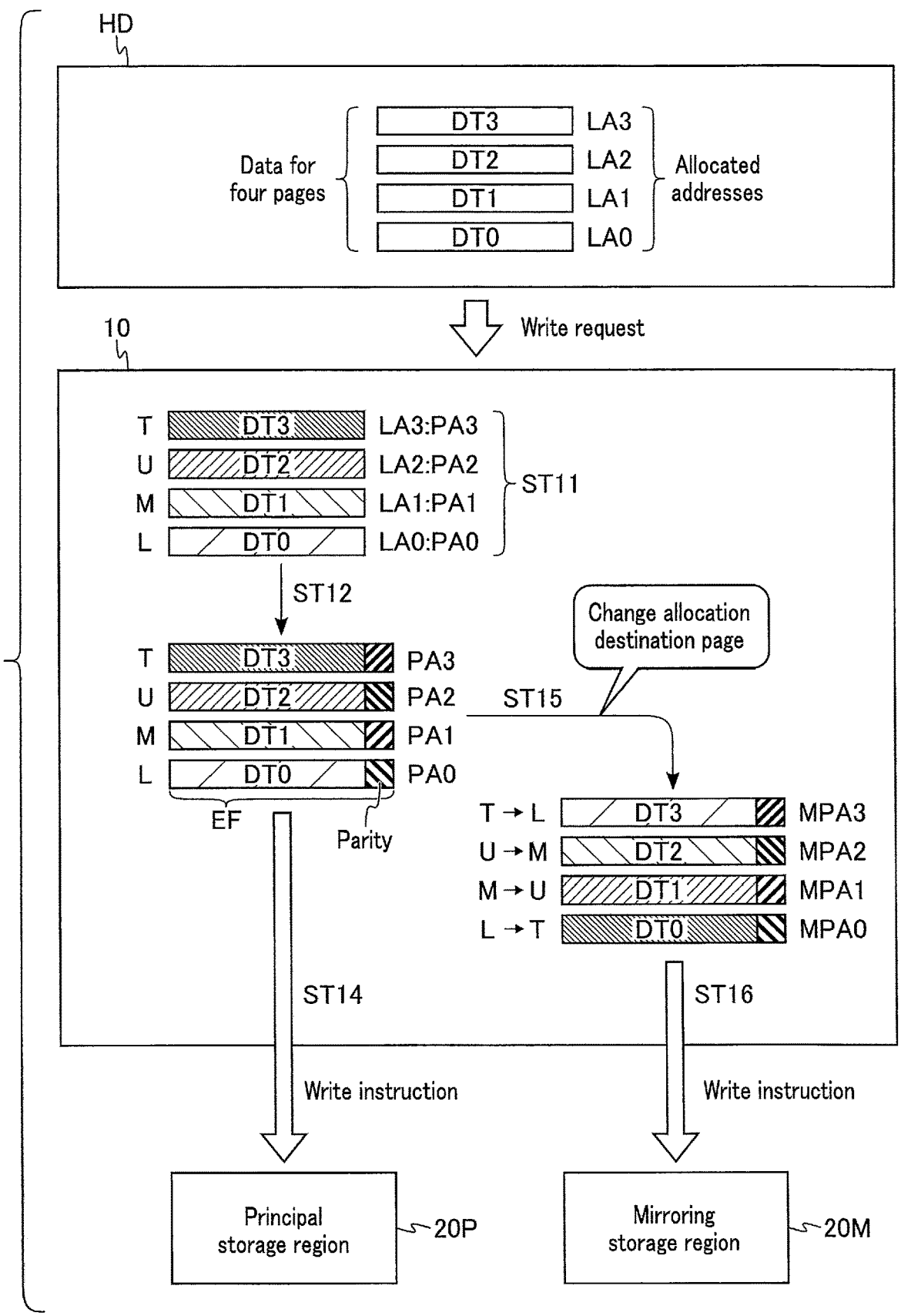
FIG. 10 is a schematic diagram showing a specific example of the write operation of the memory system according to the first embodiment.

FIG. 10 is a schematic diagram showing a specific example of a write operation of the memory system MS according to the first embodiment. In the following, a case in which the host device HD requests a write of data DT0 to DT3 to the memory system MS in the first embodiment will be described with reference to FIG. 10. In the present example, each of the data DT0 to DT3 corresponds to 1-page data.

The host device HD allocates logical addresses LA0, LA1, LA2, and LA3 to the four pages of data DT0, DT1, DT2, and DT3 for which a write is requested to the memory system MS, respectively.

After the memory system MS receives the write request of the data DT0 to DT3 from the host device HD, the memory controller 10, by executing the process of ST11 in FIG. 9, allocates a physical address PA0 to the logical address LA0 ("LA0:PA0" in FIG. 10), allocates a physical address PA1 to the logical address LA1 ("LA1:PA1" in FIG. 10), allocates a physical address PA2 to the logical address LA2 ("LA2:

PA2" in FIG. 10), and allocates a physical address PA3 to the logical address LA3 ("LA3:PA3" in FIG. 10).

A write destination page of the physical address PA0 is a lower page ("L" in FIG. 10). A write destination page of the physical address PA1 is an upper page ("M" in FIG. 10). A write destination page of the physical address PA2 is an upper page ("U" in FIG. 10). A write destination page of the physical address PA3 is a top page ("T" in FIG. 10). As for a line interval of hatching added to a box indicating the data DT, the narrower the line interval is, the larger the number of reads is, and the wider the line interval is, the smaller the number of reads is.

Then, the memory controller 10, by executing the process of ST12 in FIG. 9, generates the ECC frame EF including parity for each piece of data DT.

Then, the memory controller 10, by executing the process of ST14 in FIG. 9, orders the principal storage region 20P to write the 4-page data using the respective ECC frames of the data DT0 to DT3 by designating the physical addresses PA0 to PA3. The principal storage region 20P executes this 4-page data write for the same cell unit CU associated with the physical addresses PA0 to PA3.

In addition, the memory controller 10, by executing the process of ST15 in FIG. 9, allocates the mirroring physical addresses MPA0, MPA1, MPA2, and MPA3 to the physical addresses PA0 to PA3 (the data DT0 to DT3), respectively. A write destination page of the mirroring physical address MPA0 is changed from the lower page to the top page ("L→T" in FIG. 10). A write destination page of the mirroring physical address MPA1 is changed from the middle page to the upper page ("M→U" in FIG. 10). A write destination page of the mirroring physical address MPA2 is changed from the upper page to the middle page ("U→M" in FIG. 10). A write destination page of the mirroring physical address MPA3 is changed from the top page to the lower page ("T→L" in FIG. 10).

That is, in a case where the write destination of the physical address PA is a page (e.g., lower/middle page) of a group with a small number of reads, the write destination of the mirroring physical address MPA is changed to a page (e.g., upper/top page) of a group with a large number of reads. On the other hand, in a case where the write destination of the physical address PA is a page of the group with a large number of reads, the write destination of the mirroring physical address MPA is changed to a page of the group with a small number of reads. In the present example, in a case where the number of reads of a page associated with the physical address PA is the smallest, the memory controller 10 changes the mirroring physical address MPA to a page with the largest number of reads. In addition, in a case where the number of reads of a page associated with the physical address PA is the second smallest, the memory controller 10 changes the mirroring physical address MPA to a page with the second largest number of reads.

Then, the memory controller 10, by executing the process of ST16 in FIG. 9, orders the mirroring storage region 20M to write the 4-page data using the respective ECC frames of the data DT0 to DT3 by designating the mirroring physical addresses MPA0 to MPA3. The mirroring storage region 20M executes this 4-page data write for the same cell unit CU associated with the mirroring physical addresses MPA0 to MPA3.

[1-2-2] Read Operation

Figure 11:
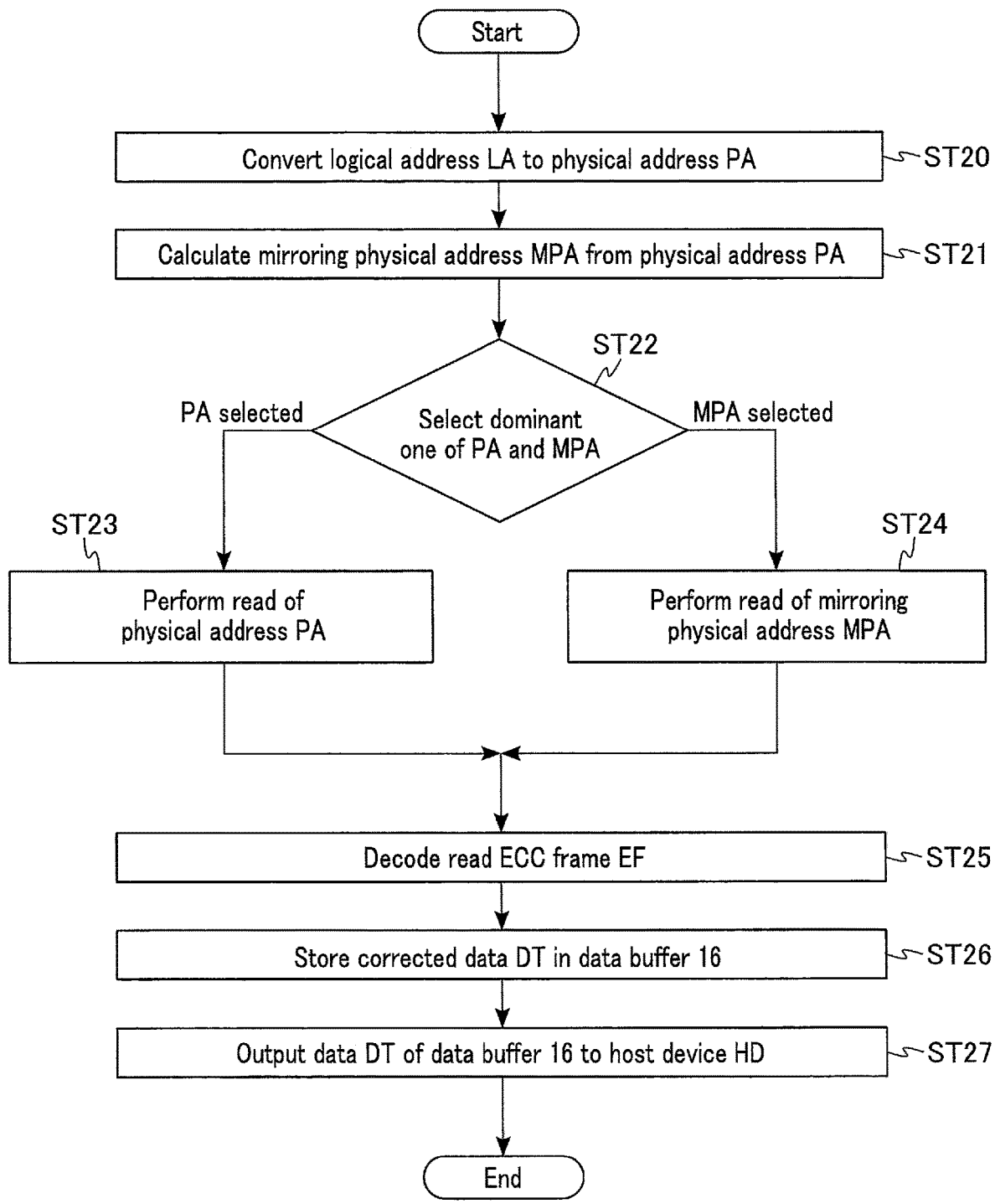
FIG. 11 is a flowchart showing an example of a read operation of the memory system according to the first embodiment.

FIG. 11 is a flowchart showing an example of a read operation of the memory system MS according to the first embodiment. In the following, the read operation of the memory system MS according to the first embodiment will be described, focusing on the operation of the memory controller 10.

Upon receipt of a read request from the host device HD, the control circuit 13 of the memory controller 10 starts a series of processing in FIG. 11 (Start). The read request includes a logical address LA that designates a read source of the data DT.

First, the control circuit 13 converts the logical address LA to a physical address PA (ST20). Specifically, the control circuit 13 acquires a physical address PA associated with the logical address LA received from the host device HD with reference to the LUT 17.

Next, the control circuit 13 calculates a mirroring physical address MPA from the physical address PA (ST21). The control circuit 13 uses the mirroring address allocating circuit 14 for calculation of the mirroring physical address MPA.

Next, the control circuit 13 selects a dominant one of the physical address PA and the mirroring physical address MPA (ST22). The dominance determination is based on the number of reads when reading the physical address PA and the number of reads when reading the mirroring physical address MPA. The control circuit 13 determines that an address of either one of the physical address PA or the mirroring physical address MPA, whichever has the smaller number of reads, is dominant. In the following descriptions, of the physical address PA and the mirroring physical address MPA, a physical address of the one selected by the process of ST22 is also referred to as a "selected address", and a physical address of the one not selected by the process of ST22 is also referred to as a "non-selected address".

In the process of ST22, if the physical address PA is selected (ST22: PA selected), the control circuit 13 performs a read of the physical address PA (ST23). That is, the control circuit 13, if it is confirmed that the physical address PA is dominant, transmits the physical address PA and a read instruction to the principal storage region 20P via the memory I/F 12. In the present embodiment, the read instruction is, for example, a read command. Accordingly, the principal storage region 20P which has received the physical address PA and the read instruction reads data (ECC frame EF) from a cell unit CU associated with the physical address PA, and transmits the data to the memory controller 10. The ECC frame read from the principal storage region 20P is, for example, temporarily stored in the data buffer 16. When the process of ST23 is completed, the control circuit 13 proceeds to the process of ST25.

In the process of ST22, if the mirroring physical address MPA is selected (ST22: MPA selected), the control circuit 13 performs a read of the mirroring physical address MPA (ST24). That is, if it is confirmed that the mirroring physical address MPA is dominant, the control circuit 13 transmits the mirroring physical address MPA and a read instruction to the mirroring storage region 20M via the memory I/F 12. Then, the mirroring storage region 20M which has received the mirroring physical address MPA and the read instruction reads data (ECC frame EF) from a cell unit CU associated with the mirroring physical address MPA, and transmits the data to the memory controller 10. The ECC frame read from the mirroring storage region 20M is, for example, temporarily stored in the data buffer 16. When the process of ST24 is completed, the control circuit 13 proceeds to the process of ST25.

In the process of ST25, the control circuit 13 decodes the read ECC frame EF. This "read ECC frame EF" corresponds to the ECC frame read from the principal storage region 20P in a case where the process of ST23 is executed prior to the process of ST25, and corresponds to the ECC frame read from the mirroring storage region 20M in a case where the process of ST24 is executed prior to the process of ST25. The control circuit 13 may execute a retry sequence when it fails in decoding of the ECC frame EF. In the present example, a case in which decoding of the ECC frame EF is successful in the process of ST25 will be described. An example of an operation in the case where the retry sequence occurs will be described in a second embodiment.

When the decoding of the read ECC frame EF is successful, the control circuit 13 stores the corrected data DT in the data buffer 16 (ST26).

Then, the control circuit 13 outputs the data DT of the data buffer 16 to the host device HD (ST27). The data DT output to the host device HD in the process of ST27 of the first embodiment corresponds to the data DT corrected by the decoding of the ECC frame EF read from the physical address PA when the process of ST23 is executed prior to the process of ST27, and corresponds to the data DT corrected by the decoding of the ECC frame EF read from the mirroring physical address MPA when the process of ST24 is executed prior to the process of ST27.

After the process of ST27, the control circuit 13 discards the data DT of the data buffer 16, and ends the series of processing in FIG. 11 (End).

(Specific Example of Read Operation)

Figure 12:
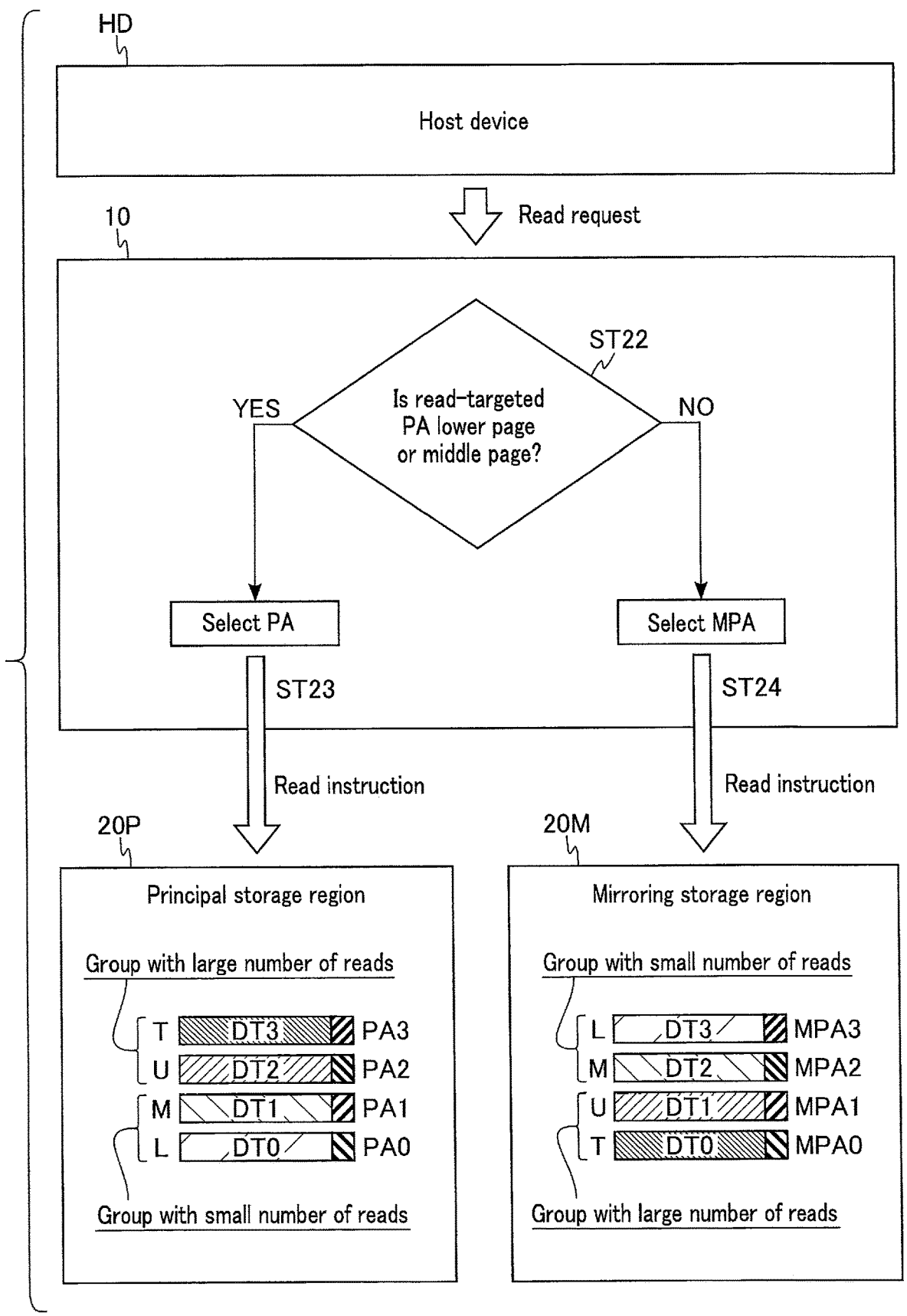
FIG. 12 is a schematic diagram showing a specific example of the read operation of the memory system according to the first embodiment.

FIG. 12 is a schematic diagram showing a specific example of a read operation of the memory system MS according to the first embodiment. In the following, a case in which the host device HD requests a read of 1-page data to the memory system MS in the first embodiment will be described with reference to FIG. 12.

In the present example, the memory system MS duplicates and stores the data DT0, DT1, DT2, and DT3 using the principal storage region 20P and the mirroring storage region 20M. Specifically, the principal storage region 20P stores the data DT0, DT1, DT2, and DT3 in the physical addresses PA0, PA1, PA2, and PA3, respectively. The mirroring storage region 20M stores the data DT0, DT1, DT2, and DT3 in the mirroring physical addresses MPA0, MPA1, MPA2, and MPA3, respectively.

Then, the data DT0 is stored in a lower page ("L" in FIG. 12) in the principal storage region 20P, and is stored in a top page ("T" in FIG. 12) in the mirroring storage region 20M. The data DT1 is stored in a middle page ("M" in FIG. 12) in the principal storage region 20P, and is stored in an upper page ("U" in FIG. 12) in the mirroring storage region 20M. The data DT2 is stored in an upper page in the principal storage region 20P, and is stored in a middle page in the mirroring storage region 20M. The data DT3 is stored in a top page in the principal storage region 20P, and is stored in a lower page in the mirroring storage region 20M. As for a line interval of hatching added to a box indicating the data DT, the narrower the line interval is, the larger the number of reads is, and the wider the line interval is, the smaller the number of reads is.

After the memory system MS receives a read request from the host device HD, the memory controller 10 selects an address (storage region) to instruct a read by executing the process of ST22 in FIG. 11. Rephrasing the process of ST22 in accordance with the present example, in the process of ST22, the control circuit 13 confirms whether or not a read-targeted physical address PA is a lower page or a middle page. That is, the control circuit 13 confirms whether or not the read-targeted physical address PA corresponds to the group with a small number of reads.

If the read-targeted physical address PA is a lower page or a middle page (ST22: YES), the control circuit 13 selects the physical address PA and transmits a read instruction to the principal storage region 20P. Accordingly, the principal storage region 20P executes a lower or middle read, which is the group with a small number of reads.

On the other hand, if the read-targeted physical address PA is not a lower page or a middle page (ST22: NO), the control circuit 13 selects a mirroring physical address MPA and transmits a read instruction to the mirroring storage region 20M. That is, if the read-targeted physical address PA is the upper or top page included in the group with a large number of reads, the memory controller 10 executes a read for the mirroring storage region 20M in which the same data as the page to be read is stored in the group with a small number of reads.

[1-3] Advantageous Effect of First Embodiment

As described above, the memory system MS according to the first embodiment sets a page for storing a copy in the mirroring storage region 20M to a page having a number of reads different from that of the principal storage region 20P. Specifically, when the host device HD requests a write of lower page data, the memory system MS writes received data in a lower page of the principal storage region 20P. On the other hand, a copy of the lower page data is written in a top page of the mirroring storage region 20M. The middle page data is written in a middle page of the principal storage region 20P. On the other hand, a copy of the middle page is written in an upper page of the mirroring storage region 20M. Upper page data is written in an upper page of the principal storage region 20P. On the other hand, a copy of the top page data is written in a middle page of the mirroring storage region 20M. Top page data is written in a top page of the principal storage region 20P. On the other hand, a copy of the top page data is written in a lower page of the mirroring storage region 20M.

FIG. 13 is a table showing an example of the number of reads in a read operation of the memory system MS according to the first embodiment. As shown in FIG. 13, when the host device HD requests a lower read, the number of reads required at a storage destination of the lower page data is one in the principal storage region 20P and eight in the mirroring storage region 20M. Similarly, when the host device HD requests a middle read, the number of reads required at a storage destination of the middle page data is two in the principal storage region 20P and four in the mirroring storage region 20M. When the host device HD requests an upper read, the number of reads required at a storage destination of the upper page data is four in the principal storage region 20P and two in the mirroring storage region 20M. When the host device HD requests a top read, the number of reads required at a storage destination of the top page data is eight in the principal storage region 20P and one in the mirroring storage region 20M.

Then, the memory system MS according to the first embodiment reads the data requested by the host device HD in the storage region having the smaller number of reads. Specifically, the memory system MS according to the first embodiment reads data from the principal storage region 20P when the lower and middle reads corresponding to the group with a small number of reads are requested, and reads data from the mirroring storage region 20M when the upper and top reads corresponding to the group with a large number of reads are requested.

That is, in the memory system MS according to the first embodiment, an average number of reads when each of the lower/middle/upper/top reads is executed is (1+2+2+1)/4=1.5. On the other hand, in the normal read with the 1-2-4-8 coding, an average number of reads when each of the lower/middle/upper/top reads is executed is (1+2+4+8)/4=3.75. As described above, the memory system MS according to the first embodiment appropriately changes an address for writing at the time of a write and an address selected at the time of a read between the principal storage region 20P and the mirroring storage region 20M, thereby improving the latency in the read operation rather than a case of writing a copy in the same page.

Further, a page having a small number of reads has a lower probability of generating an error bit, and therefore has a higher reliability than a page having a large number of reads. Then, in the memory system MS according to the first embodiment, the same data is written in a page having a small number of reads in either the principal storage region 20P or the mirroring storage region 20M. As a result, in the memory system MS, any data received from the host device HD can be written in a highly reliable page, and the reliability of the data can be improved. Further, since the memory system MS executes a read for a page with a high reliability of data, it is possible to suppress the occurrence of a retry sequence and suppress a decrease in latency.

[1-4] Modification of First Embodiment

In the memory system MS according to the first embodiment, a case in which the mirroring address allocating circuit 14 changes a write destination page between a physical address PA and a mirroring physical address MPA has been described, but the present invention is not limited thereto. The mirroring address allocating circuit 14 may change an address of a write destination word line WL between a physical address PA and a mirroring physical address MPA. In the following, points different from the first embodiment will be described regarding a modification of the first embodiment.

[1-4-1] Write Operation

FIG. 14 is a schematic diagram showing a specific example of a write operation in the modification of the first embodiment. In the following, in the modification of the first embodiment, a case is described in which the host device HD requests a write of data sets DTS0 to DTS7 for one block BLK to the memory system MS with reference to FIG. 14.

Note that a data set DTS is a unit of data to be stored in one cell unit CU. The data set DTS includes 4-page data, for example. In addition, in the present example, the word lines WL0 to WL3 are classified into a "first word line group GR1", and the word lines WL4 to WL7 are classified into a "second word line group GR2". As shown in FIG. 6, the first word line group GR1 includes four word lines WL arranged on a lower layer side, and the second word line group GR2 includes four word lines WL arranged on an upper layer side. In the present example, a case will be described in which a reliability of data is the lowest in the word lines WL0 and WL7 provided at end portions and increases as the distance from the end portions increases. As for a line interval of hatching added to a box indicating the data set DTS, the wider the line interval is, the higher the reliability of data is, and the narrower the line interval is, the lower the reliability of data is.

The host device HD allocates a logical address group to each of the data sets DTS0 to DTS7 for one block BLK for which a write is requested to the memory system MS. Each logical address group includes a plurality of logical addresses LA corresponding to one cell unit CU.

After the memory system MS receives a write request of the data sets DTS0 to DTS7 from the host device HD, the memory controller 10 executes the process of ST11 in FIG. 9. Specifically, the memory controller 10 allocates physical address groups to the respective logical address groups of the data sets DTS0 to DTS7. Each physical address group includes a plurality of physical addresses PA allocated to one cell unit CU. In the present example, the memory controller 10 allocates the data sets DTS0 to DTS7 to the physical address groups corresponding to the word lines WL0 to WL7, respectively (allocation destination WL). That is, the data sets DTS0 to DTS3 are associated with the first word line group GR1, and the data sets DTS4 to DTS7 are associated with the second word line group GR2.

Then, the memory controller 10, by executing the process of ST12 in FIG. 9, generates a plurality of ECC frame sets EFS in which parity is added for each piece of 1-page data of the data sets DTS0 to DTS7. After that, the memory controller 10, by executing the process of ST14 in FIG. 9, appropriately orders the principal storage region 20P to perform a write for each word line WL using the ECC frame set EFS of each data set DTS.

In addition, the memory controller 10, by executing the process of ST15 in FIG. 9, allocates mirroring physical address groups respectively to the physical address groups. In the present example, the allocation destination word lines WL of the data sets DTS are interchanged between the first word line group GR1 and the second word line group GR2. Specifically, the allocation destination word lines WL of the data sets DTS0 to DTS3 are changed to the word lines WL4 to WL7, respectively. In addition, the allocation destination word lines WL of the data sets DTS4 to DTS7 are changed to the word lines WL0 to WL3, respectively. Thereby, in the modification of the first embodiment, when a write destination in the principal storage region 20P is a word line WL having a high reliability, a write destination in the mirroring storage region 20M is changed to a word line WL having a low reliability. After that, the memory controller 10, by executing the process of ST16 in FIG. 9, appropriately orders the mirroring storage region 20M to perform a write for each word line WL using the ECC frame set EFS of each data set DTS.

[1-4-2] Read Operation

FIG. 15 is a schematic diagram showing a specific example of a read operation of the memory system according to the modification of the first embodiment. In the following, a case in which the host device HD requests a read of the word lines WL0 to WL7 to the memory system MS in the modification of the first embodiment will be described with reference to FIG. 15.

In the present example, the memory system MS duplicates and stores the data sets DTS0, DTS1, DTS2, DTS3, DTS4, DTS5, DTS6, and DTS7 using the principal storage region 20P and the mirroring storage region 20M. Specifically, the data sets DTS0 to DTS3 are stored to correspond to the word lines WL0 to WL3, respectively, in the principal storage region 20P, and are stored to correspond to the word lines WL4 to WL7, respectively, in the mirroring storage region 20M. The data sets DTS4 to DTS7 are stored to correspond to the word lines WL4 to WL7, respectively, in the principal storage region 20P, and are stored to correspond to the word lines WL0 to WL3, respectively, in the mirroring storage region 20M. As for a line interval of hatching added to a box indicating the data DT, the wider the line interval is, the higher the reliability of data is, and the narrower the line interval is, the lower the reliability of data is.

After the memory system MS receives a read request from the host device HD, the memory controller 10 selects an address (storage region) to instruct a read by executing the process of ST22 in FIG. 11. Rephrasing the process of ST22 in accordance with the present example, in the process of ST22, the control circuit 13 confirms whether or not a read-targeted physical address PA is a high reliability WL group.

If the read-targeted physical address PA is the high reliability WL group (ST22: YES), the control circuit 13 selects the physical address PA and transmits a read instruction to the principal storage region 20P. That is, when data of a cell unit CU corresponding to the high reliability WL group (e.g., the word lines WL2 to WL5) is requested, the memory controller reads the requested data from the principal storage region 20P.

On the other hand, if the read-targeted physical address PA is not the high reliability WL group (ST22: NO), the control circuit 13 selects a mirroring physical address MPA and transmits a read instruction to the mirroring storage region 20M. That is, when the read-targeted physical address PA corresponds to a word line WL included in a low reliability WL group, the memory controller 10 executes a read for the mirroring storage region 20M in which the same data as the page to be read is stored in the high reliability WL group. In other words, when data of a cell unit CU corresponding to the low reliability WL group (e.g., the word lines WL0, WL1, WL6, and WL7) is requested, the memory controller reads the requested data from the mirroring storage region 20M.

[1-4-3] Advantageous Effect of Modification of First Embodiment

The memory system MS according to the modification of the first embodiment can improve the reliability of data by executing the write operation and the read operation as described above. When the reliability of data is improved, the occurrence of a retry sequence is suppressed. Accordingly, the memory system MS according to the modification of the first embodiment can further suppress a decrease in latency of the memory system MS.

Note that the modification of the first embodiment can be combined with the first embodiment. A combination of the modification of the first embodiment and the first embodiment can improve the latency and improve the reliability of data. When the modification of the first embodiment and the first embodiment are combined, priority may be set for each of an address and a page of a word line WL, and an optimal write destination and read source may be selected based on the priority.

[2] Second Embodiment

A memory system MS according to a second embodiment has the same configuration as that of the first embodiment. The memory system MS according to the second embodiment, when decoding of an ECC frame EF in a read operation fails, improves latency by using the principal storage region 20P and the mirroring storage region 20M. In the following, points different from the first embodiment will be described regarding the memory system MS according to the second embodiment.

[2-1] Read Operation

Figure 16:
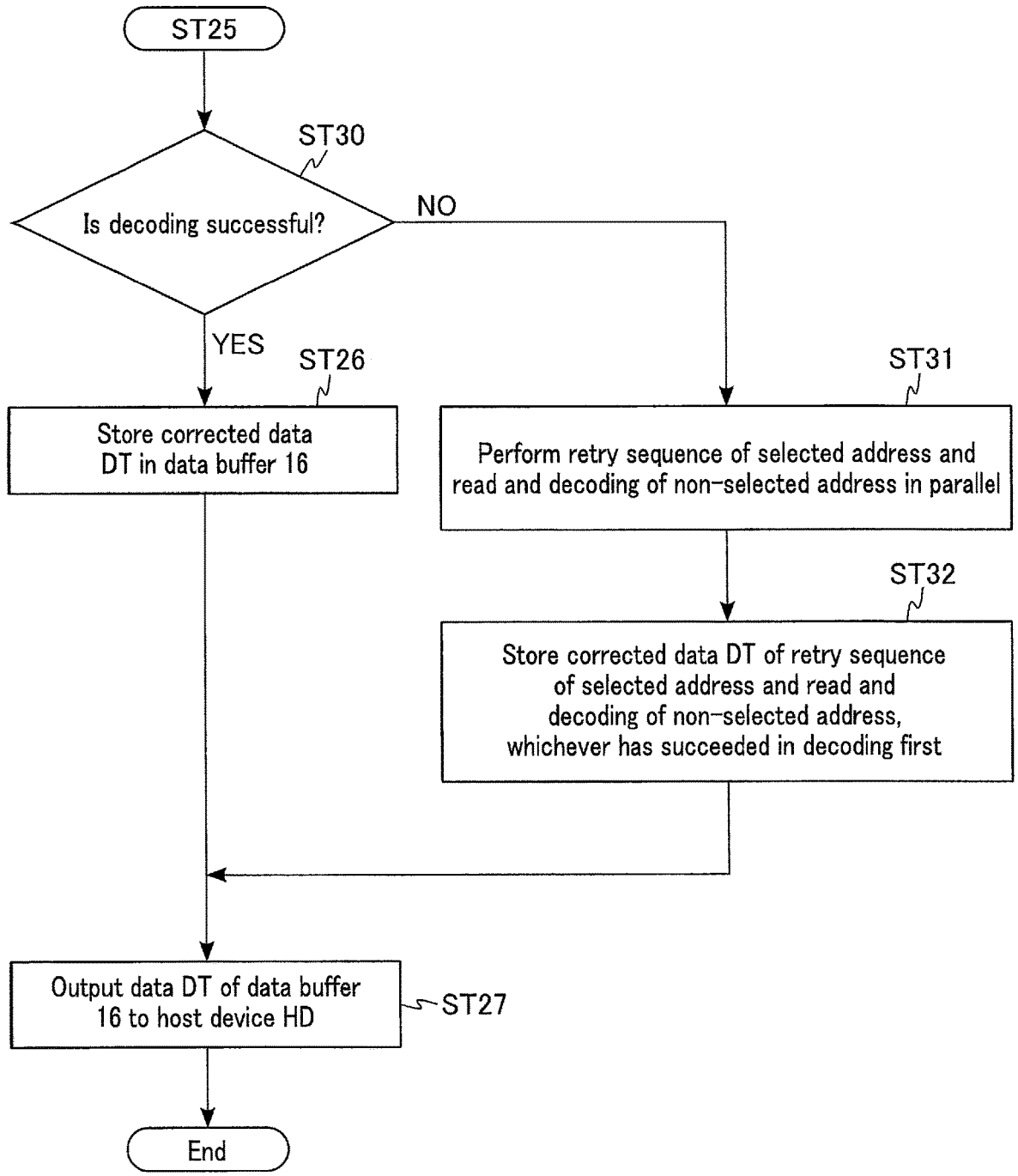
FIG. 16 is a flowchart showing an example of a read operation of a memory system according to a second embodiment.

FIG. 16 is a flowchart showing an example of a read operation of the memory system MS according to the second embodiment. In the following, the read operation of the memory system MS according to the second embodiment will be described with reference to FIG. 16, focusing on the operation of the memory controller 10.

In the read operation of the memory system MS according to the second embodiment, the processes of ST25 and the subsequent steps are different from those in the first embodiment. Upon execution of decoding of the ECC frame EF read from the selected address in the process of ST25, the control circuit 13 starts a series of processing in FIG. 16.

First, the control circuit 13 confirms whether or not the decoding is successful (ST30). That is, whether or not the ECC circuit 15 has succeeded in decoding of the ECC frame EF read from the selected address is confirmed by the control circuit 13.

In the process of ST30, if it is confirmed that the decoding was successful (ST30: YES), the control circuit 13 stores the corrected data DT in the data buffer 16 in the same manner as in the first embodiment (ST26). When the process of ST26 is completed, the control circuit 13 proceeds to the process of ST27.

In the process of ST30, if it is confirmed that the decoding was not successful (i.e., the decoding failed) (ST30: NO), the control circuit 13 performs a retry sequence of a selected address and a read and decoding of a non-selected address in parallel (ST31). In the retry sequence, the control circuit 13 executes a shift read, Vth tracking, etc. The shift read is a read in which a read voltage is shifted. The Vth tracking is an operation of calculating an optimum read voltage based on a result of multiple reads. Then, the control circuit 13 decodes the ECC frame EF read by the shift read, Vth tracking, etc. in the retry sequence. The control circuit 13 may execute soft decision decoding in the retry sequence. The "read and decoding of a non-selected address" corresponds to the read and decoding of the mirroring physical address MPA (the processes of ST24 and ST25 shown in FIG. 11) when the physical address PA is selected by the process of ST22 shown in FIG. 11, and corresponds to the read and decoding of the physical address PA (the processes of ST23 and ST25 shown in FIG. 11) when the mirroring physical address MPA is selected by the process of ST22 shown in FIG. 11.

Then, the control circuit 13 stores in the data buffer 16 the corrected data DT of the retry sequence of the selected address and the read and decoding of the non-selected address, whichever has succeeded in decoding first (ST32). When the process of ST32 is completed, the control circuit 13 proceeds to the process of ST27.

In the process of ST27, the control circuit 13 outputs the data DT of the data buffer 16 to the host device HD. The data DT output to the host device HD in the process of ST27 of the second embodiment corresponds to the data DT corrected by decoding of an ECC frame EF read from the selected address when the process of ST26 is executed prior to the process of ST27, and corresponds to the corrected data of the retry sequence of the selected address and the read and decoding of the non-selected address, whichever has succeeded in decoding first, when the processes of ST31 and ST32 are executed prior to the process of ST27.

After the process of ST27, the control circuit 13 discards the data DT of the data buffer 16, and ends the series of processing in FIG. 16 (End). The other operations of the memory system MS according to the second embodiment are the same as those of the first embodiment.

[2-2] Advantageous Effect of Second Embodiment

As described above, the memory system MS according to the second embodiment executes a retry sequence for a selected address of the principal storage region 20P and the mirroring storage region 20M and a read for a non-selected address in parallel when decoding of a read ECC frame EF fails. Then, the memory system MS outputs to the host device HD the data of the one that has succeeded in decoding of the ECC frame EF earlier. As a result, the memory system MS according to the second embodiment can suppress deterioration of latency when the first read (decoding) fails.

[3] Third Embodiment

A memory system MS according to a third embodiment has a configuration in which a memory device 20a, which is a shift register type non-volatile memory, is controlled by the memory controller 10. The shift register type non-volatile memory is formed to execute data write and read in units of pages by a first-in first-out (FIFO) method or a last-in first-out (LIFO) method. In the following, points different from the first embodiment will be described regarding the memory system MS according to the third embodiment.

[3-1] Configuration of Memory Device 20a

Figure 17:
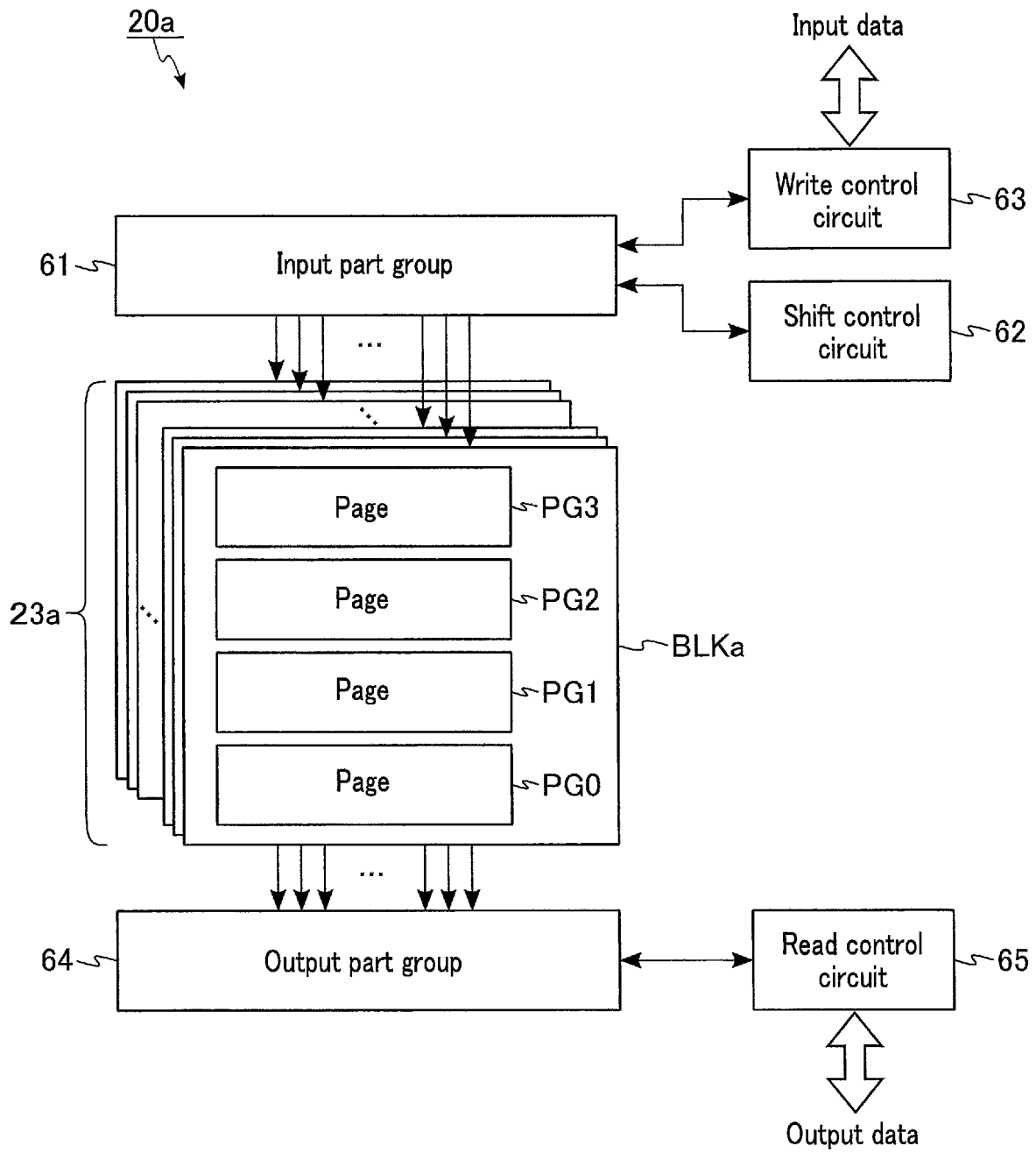
FIG. 17 is a block diagram showing an example of a configuration of a memory device according to a third embodiment.

FIG. 17 is a block diagram showing an example of a configuration of the memory device 20a according to the third embodiment. FIG. 17 shows a case in which the memory device 20a is a shift register type non-volatile memory using the FIFO method as an example. As shown in FIG. 17, the memory device 20a includes a memory cell array 23a, an input part group 61, a shift control circuit 62, a write control circuit 63, an output part group 64, and a read control circuit 65.

The memory cell array 23a is a storage circuit including a set of a plurality of memory cells. The memory cell array 23a includes a plurality of blocks BLKa. The memory device 20a executes data write and read in units of pages included in the block BLKa by the FIFO method. In the third embodiment, to simplify the descriptions, a case in which each block BLKa stores 4-page data (pages PG0 to PG3) will be described as an example. The block BLKa includes a plurality of layers that respectively function as a plurality of stages of a shift register. That is, one layer functions as one of the stages of the shift register. The memory device 20a can shift data stored in individual layers from the layer corresponding to the first stage to the layer corresponding to the last stage on a layer-by-layer basis. Then, the memory device 20a can write data in the layer corresponding to the first stage, and read data in the layer corresponding to the last stage.

The input part group 61 includes a plurality of input parts. The input parts are respectively coupled to input sides of a plurality of blocks BLKa. Each input part includes a write circuit and a shift circuit. The write circuit of the input part can write 1-bit data to a plurality of memory cells provided at the first stage of the shift register. The shift circuit of the input part can pass a shift current to each of memory strings MH to be described later.

The shift control circuit 62 controls the shift circuits of the input part group 61. The shift control circuit 62 selects any one of the blocks BLKa based on an address input to the memory device 20a. Then, by using a shift circuit of an input part coupled to the selected block BLKa, the shift control circuit 62 can shift data in units of layers of that block BLKa from the layer corresponding to the first stage to the layer corresponding to the last stage on a layer-by-layer basis.

The write control circuit 63 controls the write circuits of the input part group 61. Data (input data) is input to the write control circuit 63 from the memory controller 10, and the write control circuit 63 selects any one of the blocks BLKa based on an address input to the memory device 20a. Then, by using a write circuit of an input part coupled to the selected block BLKa, the write control circuit 63 can write the data to a plurality of memory cells provided at the first stage of that block BLKa.

The output part group 64 includes a plurality of output parts. The output parts are respectively coupled to output sides of the plurality of blocks BLKa. In the memory system MS of the FIFO method, a memory cell array 23a is coupled between the input part group 61 and the output part group 64. Each output part includes a sense circuit and a latch circuit. The sense circuit of the output part can read data stored in a plurality of memory cells provided at the last stage. The latch circuit of the output part temporarily stores the data read by the sense circuit. Note that in the shift register type non-volatile memory, a read of data from the block BLKa is a destructive read in which data is destroyed in accordance with the read.

The read control circuit 65 controls the sense circuits of the output part group 64. The read control circuit 65 selects any one of the blocks BLKa based on an address input to the memory device 20a. Then, by using a sense circuit of an output part coupled to the selected block BLKa, the read control circuit 65 can read data of a plurality of memory cells provided at the last stage of that block BLKa, and output the read data (output data) to the memory controller 10.

In the third embodiment, the memory device 20a used as a principal storage region is referred to as a "principal storage region 20aP". The memory device 20a used as a mirroring storage region is referred to as a "mirroring storage region 20aM".

(Configuration of Memory Cell Array 23a)

FIG. 18 is a block diagram showing an example of a configuration of the memory cell array 23a included in the memory device 20a according to the third embodiment. FIG. 18 indicates one block BLKa, and also shows the input part group 61 and the output part group 64. As shown in FIG. 18, the block BLKa is logically segmented, and includes, for example, a plurality of layers L0 to L15. The layers L0 to L15 of the block BLKa are realized by a plurality of data-holding shift rows included in each block BLKa. The block BLKa includes a plurality of memory strings MH0 to MHm (m is an integer of 1 or more) as the data-holding shift rows.

Each memory string MH includes, for example, a plurality of memory cells MC0 to MC15. Each memory cell MC is formed to be capable of storing 1-bit data. The memory cells MC0 to MC15 are coupled in series, and are provided to correspond to the layers L0 to L15, respectively. In the FIFO method, the memory cell MC0 of each memory string MH is coupled to the output part group 64, and the memory cell MC15 of each memory string MH is coupled to the input part group 61. A plurality of memory cells MC provided in the same layer within the same block BLKa are treated as one stage of the shift register. The layer L15 that is closest to the input part group 61 is used as the first stage of the shift register. The layer L0 that is closest to the output part group 64 is used as the last stage of the shift register.

Each page PG includes a set of some adjacent layers. For example, a page PG0 is formed of a plurality of memory cells MC0 to MC3 provided in the layers L0 to L3. A page PG1 is formed of a plurality of memory cells MC4 to MC7 provided in the layers L4 to L7. A page PG2 is formed of a plurality of memory cells MC8 to MC11 provided in the layers L8 to L11. A page PG3 is formed of a plurality of memory cells MC12 to MC15 provided in the layers L12 to L15.

A size of one page PG is designed based on a size of an ECC frame. That is, based on the size of an ECC frame, the number of memory strings MH and the number of layers that form 1 page PG may be changed as appropriate.

Note that in the shift register type non-volatile memory, "0" and "1"-bit data may be respectively allocated to two states of the memory cell MC, and "0"-bit data and "1"-bit data may be stored based on a difference in state from an adjacent memory cell MC. Each block BLKa may have a reference layer used as a data determination criterion. The reference layer can be, for example, arranged in a layer (e.g., the layer L0) that is read first in a read operation of the block BLKa.

[3-2] Operation

In the following, after an outline of the operation of the shift register type non-volatile memory is described, a write operation and a read operation of the memory system MS according to the third embodiment will be described.

[3-2-1] Outline of Operation of Shift Register Type Non-Volatile Memory (Write Operation of Shift Register Type Non-Volatile Memory)

Figure 19:
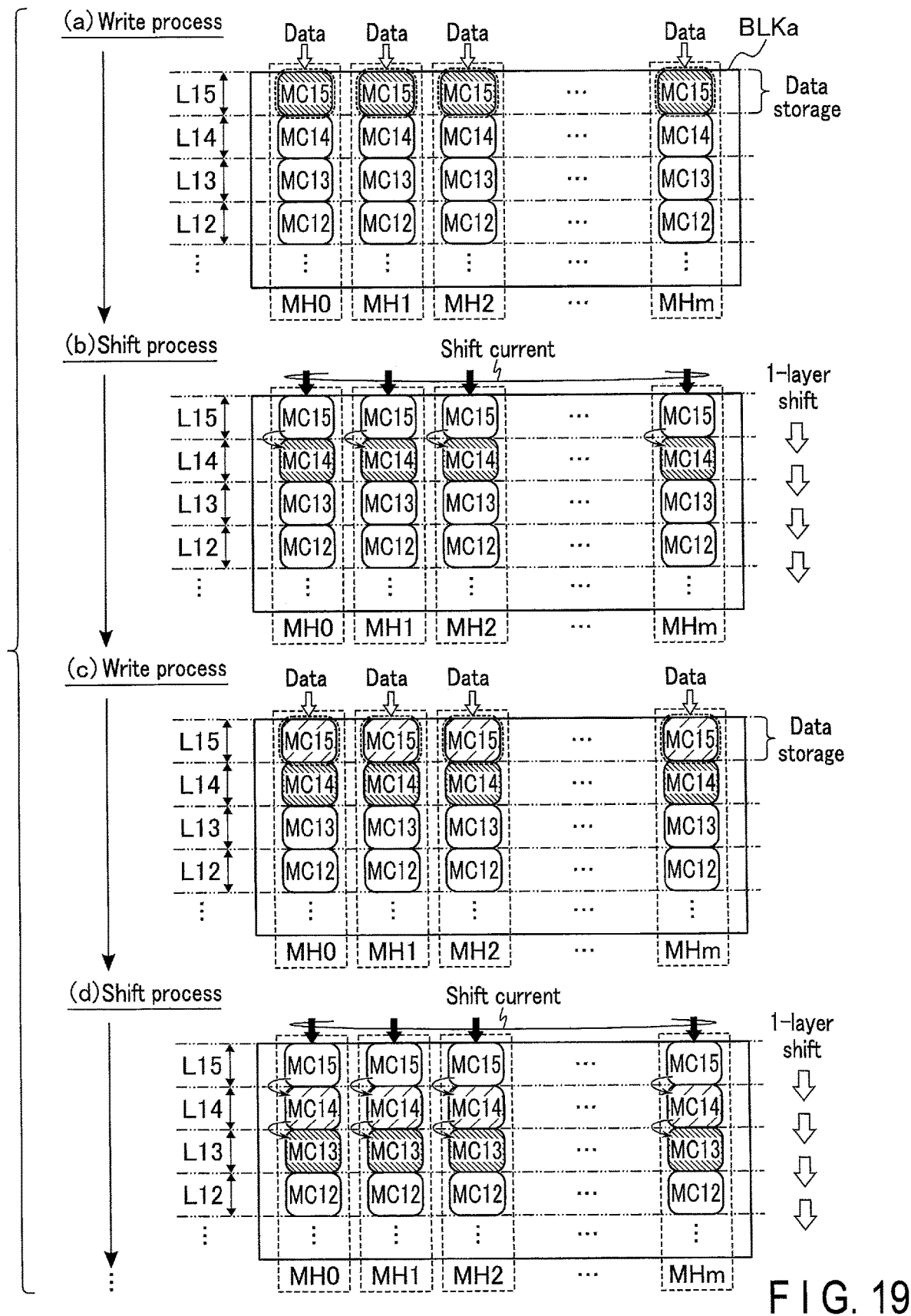
FIG. 19 is a schematic diagram showing an example of a write operation of a shift register type non-volatile memory.

FIG. 19 is a schematic diagram showing an example of a write operation of the shift register type non-volatile memory. FIGS. 19 (a), (b), (c), and (d) show some of the processing in the write operation of the shift register type non-volatile memory. In the following, an example of the write operation of the shift register type non-volatile memory will be described with reference to FIG. 19.

First, as shown in FIG. 19 (a), a write process of data for one layer is executed. Specifically, for example, in a case where the memory device 20a is a domain wall displacement memory, which is a type of a shift register type non-volatile memory, the write circuits of the input part group 61 generate a magnetic field according to data to be written in the memory cells MC15. Accordingly, the memory cells MC15 of the uppermost layer L15 are given a magnetic field, and the polarity of the memory cells MC15 changes according to data to be written. Thereby, the memory cells MC15 have desired data written therein.

Next, as shown in FIG. 19 (b), a shift process for one layer is executed. For example, the shift circuits of the input part group 61 pass a shift current to each memory string MH. Accordingly, the written data within the memory string MH shifts one layer in a direction from the uppermost layer L15 to the lowermost layer L0.

Next, as shown in FIG. 19 (c), a write process of data for one layer is executed. A data write method in FIG. 19 (c) is similar to the write process in FIG. 19 (a). When this write process is completed, the block BLKa enters a state in which the data written in FIG. 19 (a) is stored in the memory cells MC14 of the layer L14, and the data written in FIG. 19 (c) is stored in the memory cells MC15 of the layer L15.

Next, as shown in FIG. 19 (d), a shift process for one layer is executed. When this shift process is completed, the block BLKa enters a state in which the data written in FIG. 19 (a) is stored in the memory cells MC13 of the layer L13, and the data written in FIG. 19 (c) is stored in the memory cells MC14 of the layer L14.

As described above, in the write operation of the shift register type non-volatile memory, a write process for one layer and a shift process for one layer are repeatedly executed. That is, in each memory string MH, a memory location of previously written data is moved to a rear side when data is written next. Then, the write process for one layer and the shift process for one layer are repeatedly executed so that data is written in all the layers within the block BLKa.

(Read Operation of Shift Register Type Non-Volatile Memory)

FIG. 20 is a schematic diagram showing an example of a read operation of a shift register type non-volatile memory. FIGS. 20 (a), (b), and (c) show some of the processing in the read operation of the shift register type non-volatile memory. In the following, an example of the read operation of the shift register type non-volatile memory will be described with reference to FIG. 20.

First, as shown in FIG. 20 (a), a read process of data for one layer is executed. Specifically, for example, in a case where the memory device 20a is a domain wall displacement memory, the sense circuit includes a magnetic sensor. A resistance value of the magnetic sensor changes based on the polarity of the memory cells MC0 of the lowermost layer L0. Then, for example, the input part group 61 passes a read current to each memory string MH. Thereby, the sense circuits of the output part group 64 can determine data based on the resistance value of the magnetic sensor. The determined data is retained in the latch circuits of the output part group 64. After that, the data retained in the latch circuits is appropriately output to the host device HD.

Next, as shown in FIG. 20 (b), a shift process for one layer is executed. The content of the shift process is similar to that of the write operation. As a result, the written data in the memory string MH is shifted for one layer in a direction from the uppermost layer L15 to the lowermost layer L0, and the data stored in the memory cell MC0 before the shift process is discarded. Note that a read current is set to be a current smaller than the shift current so that an occurrence of a data shift is prevented.

Next, as shown in FIG. 20 (c), a read process of data for one layer is executed. A read method of data in FIG. 20 (c) is similar to the read process in FIG. 20 (a).

As described above, in the read operation of the shift register type non-volatile memory, a read process for one layer and a shift process for one layer are repeatedly executed. Then, the read process for one layer and the shift process for one layer are repeatedly executed so that data of all the layers within the block BLKa is read.

The memory device 20a of the FIFO method can read the data which is first written in the block BLKa first. On the other hand, the memory device 20*a* of the FIFO method can read data which is written in the block BLKa last only after previously written data is read. Thus, the read operation of the shift register type non-volatile memory has a smaller latency as a layer in which data is stored becomes closer to the output side, and has a larger latency as the layer becomes farther from the output side. As such, the shift register type non-volatile memory has a variation in latency for each page to be read.

Note that in the shift register type non-volatile memory, a read of data is a destructive read in which data is destroyed in accordance with the read. Thus, also in a case where a read-targeted page is a part of pages included in the block BLKa, a read is executed on all the pages for the selected block BLKa. That is, in a case where a read operation is executed on one written block BLKa as a read-targeted block BLKa, shift operations for the number of layers included in the block BLKa are executed. After that, the read data is written back in the memory device 20*a*. A block BLKa in which the read data is written back may be the same as or different from the block BLKa in which the read data is stored. As the data used for the write back, data which is error-corrected by the ECC processing of the memory controller 10 may be used, or data which is read from the memory device 20*a* may be used.

[3-2-2] Write Operation

Figure 21:
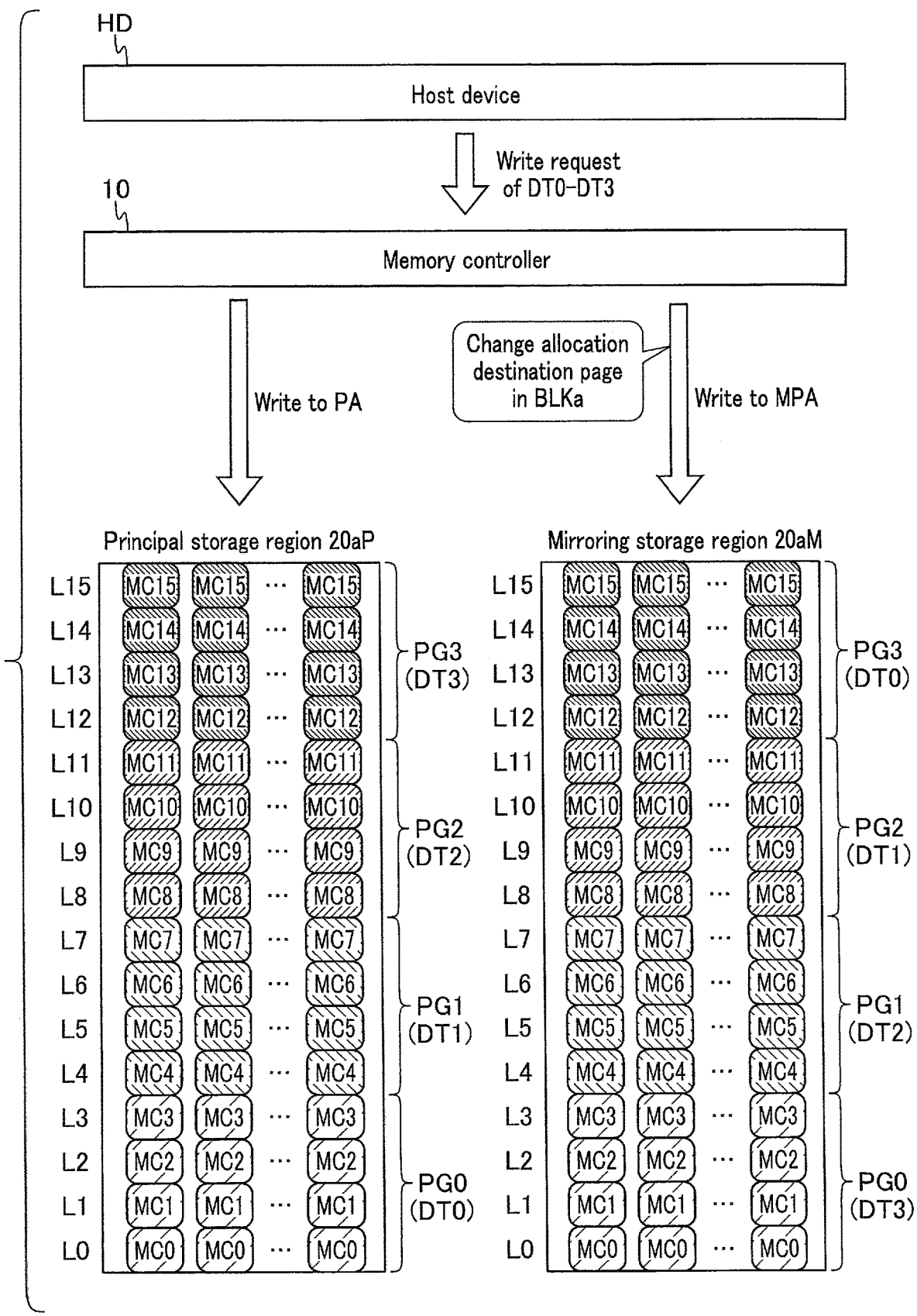
FIG. 21 is a schematic diagram showing a specific example of a write operation of a memory system according to the third embodiment.

FIG. 21 is a schematic diagram showing a specific example of a write operation of the memory system MS according to the third embodiment. In the following, a case in which the host device HD requests a write of data DT0 to DT3 to the memory system MS in the third embodiment will be described with reference to FIG. 21. In the present example, each of the data DT0 to DT3 corresponds to 1-page data.

The host device HD allocates the data DT0 to a logical address LA that designates a page PG0. The host device HD allocates the data DT1 to a logical address LA that designates a page PG1. The host device HD allocates the data DT2 to a logical address LA that designates a page PG2. The host device HD allocates the data DT3 to a logical address LA that designates a page PG3. As for a line interval of hatching added to a box indicating the memory cell MC, the narrower the line interval is, the larger the number of reads (shifts) of the page is, and the wider the line interval is, the smaller the number of reads (shifts) of the page is.

After the memory system MS receives a write request of the data DT0 to DT3 from the host device HD, the memory controller 10 executes the process of ST11 in FIG. 9 so as to allocate a physical address PA to the logical address LA. Then, the memory controller 10 executes the process of ST12 in FIG. 9 so as to generate an ECC frame including parity for each data DT. After that, the memory controller 10 executes the process of ST14 in FIG. 9 so as to order the principal storage region 20*a*P to write the 4-page data using the respective ECC frames of the data DT0 to DT3 by designating the physical addresses PA respectively corresponding to the pages PG0 to PG3. Accordingly, the principal storage region 20*a*P executes the write of the data DT0 to DT3 for the selected block BLKa.

In addition, the memory controller 10 executes the process of ST15 in FIG. 9 so as to allocate mirroring physical addresses MPA respectively to the physical addresses PA of the data DT0 to DT3. A write destination page of the mirroring physical address MPA allocated to the data DT0 is changed from the page PG0 to the page PG3. A write destination page of the mirroring physical address MPA allocated to the data DT1 is changed from the page PG1 to the page PG2. A write destination page of the mirroring physical address MPA allocated to the data DT2 is changed from the page PG2 to the page PG1. A write destination page of the mirroring physical address MPA allocated to the data DT3 is changed from the page PG3 to the page PG0. That is, allocation of the pages PG within the block BLKa for the write of the data DT0 to DT3 is inverted between the principal storage region 20*a*P and the mirroring storage region 20*a*M.

Then, the memory controller 10 executes the process of ST16 in FIG. 9 so as to order the mirroring storage region 20*a*M to write the 4-page data using the respective ECC frames of the data DT0 to DT3 by designating the mirroring physical addresses MPA respectively corresponding to the pages PG0 to PG3. Accordingly, the mirroring storage region 20*a*M executes the write of the data DT0 to DT3 for the selected block BLKa.

[3-2-3] Read Operation

FIG. 22 is a schematic diagram showing a specific example of a read operation of the memory system MS according to the third embodiment. In the following, a case in which the host device HD requests a read of 1-page data to the memory system MS in the third embodiment will be described with reference to FIG. 22. In the present example, each of the data DT0 to DT3 corresponds to 1-page data.

In the present example, the memory system MS duplicates and stores the data DT0, DT1, DT2, and DT3 using the principal storage region 20*a*P and the mirroring storage region 20*a*M. Specifically, the principal storage region 20*a*P stores the data DT0 in the memory cells MC0 to MC3 of the layers L0 to L3, stores the data DT1 in the memory cells MC4 to MC7 of the layers L4 to L7, stores the data DT2 in the memory cells MC8 to MC11 of the layers L8 to L11, and stores the data DT3 in the memory cells MC12 to MC15 of the layers L12 to L15. On the other hand, the principal storage region 20*a*P stores the data DT0 in the memory cells MC12 to MC15 of the layers L12 to L15, stores the data DT1 in the memory cells MC8 to MC11 of the layers L8 to L11, stores the data DT2 in the memory cells MC4 to MC7 of the layers L4 to L7, and stores the data DT3 in the memory cells MC0 to MC3 of the layers L0 to L3. As for a line interval of hatching added to a box indicating the data DT, the narrower the line interval is, the larger the number of reads (shifts) is, and the wider the line interval is, the smaller the number of reads (shifts) is.

After the memory system MS receives a read request from the host device HD, the memory controller 10 selects an address (storage region) to instruct a read by executing the process of ST22 in FIG. 11. Rephrasing the process of ST22 in accordance with the present example, in the process of ST22, the control circuit 13 confirms whether or not a read-targeted physical address PA is the page PG0 or PG1. That is, the control circuit 13 confirms whether the read-targeted physical address PA (physical location) corresponds to a group with a small number of reads (shifts).

If the read-targeted physical address PA is the page PG0 or the page PG1 (ST22: YES), the control circuit 13 selects the physical address PA and transmits a read instruction to the principal storage region 20*a*P. Accordingly, the principal storage region 20*a*P executes a read of PG0 or PG1, which is the group with a small number of reads.

On the other hand, if the read-targeted physical address PA is not the page PG0 or the page PG1 (ST22: NO), the control circuit 13 selects the mirroring physical address MPA and transmits a read instruction to the mirroring storage region 20*a*M. That is, when the read-targeted physical address PA is the page PG2 or PG3 included in the group with a large number of reads (shifts), the memory controller 10 executes a read for the mirroring storage region 20*a*M in which the same data as the page to be read is stored in the group with a small number of reads (shifts).

[3-3] Advantageous Effect of Third Embodiment

As described above, the memory system MS according to the third embodiment sets, in the shift register type non-volatile memory, a page for storing a copy in the mirroring storage region 20*a*M to a page having a number of reads different from that of the principal storage region 20*a*P, in the same manner as in the first embodiment. In other words, in the memory system MS according to the third embodiment, a write destination of copy data in the mirroring storage region 20*a*M is displaced with respect to a write location (phase) of the principal storage region 20*a*P.

FIG. 23 is a table showing an example of the number of shifts in the read operation of the memory system MS according to the third embodiment. As shown in FIG. 23, when the host device HD requests a PG0 read, the number of shifts required for a read of an address that stores data of the page PG0 is four in the principal storage region 20*a*P, and is sixteen in the mirroring storage region 20*a*M. Similarly, when the host device HD requests a PG1 read, the number of shifts required for a read of an address that stores data of the page PG1 is eight in the principal storage region 20*a*P, and is twelve in the mirroring storage region 20*a*M. When the host device HD requests a PG2 read, the number of shifts required for a read of an address that stores data of the page PG2 is twelve in the principal storage region 20*a*P, and is eight in the mirroring storage region 20*a*M. When the host device HD requests a PG3 read, the number of shifts required for a read of an address that stores data of the page PG3 is sixteen in the principal storage region 20*a*P, and is four in the mirroring storage region 20*a*M.

Then, the memory system MS according to the third embodiment executes the data read requested by the host device HD in a storage region with a smaller number of shifts in the same manner as in the first embodiment. Specifically, the memory system MS according to the third embodiment reads data from the principal storage region 20*a*P when the PG0 and PG1 reads corresponding to the group with a small number of shifts is requested, and reads data from the mirroring storage region 20*a*M when the PG2 and PG3 reads corresponding to the group with a large number of shifts is requested.

That is, in the memory system MS according to the third embodiment, an average number of reads when each of the PG0/PG1/PG2/PG3 reads is executed from only the principal storage region 20*a*P among the principal storage region 20*a*P and the mirroring storage region 20*a*M is (4+8+12+16)/4=10. On the other hand, when a copy of data is stored in the same physical location in the mirroring storage region 20*a*M as that in the principal storage region 20*a*P, an average number of reads when each of the PG0/PG1/PG2/PG3 reads is executed is (4+8+8+4)/4=6. As such, by appropriately changing an address to which to write at the time of a write and an address selected at the time of a read between the principal storage region 20*a*P and the mirroring storage region 20*a*M, the memory system MS according to the third embodiment can improve the latency rather than the case in which a copy is written in the same physical location.

[3-4] Modification of Third Embodiment

The operation described in the third embodiment is applicable to a memory device 20*a* of a LIFO method. The memory device 20*a* of the LIFO method performs data write and read in a layer corresponding to the first stage. Simply speaking, in the memory device 20*a* of the LIFO method, each of the input part group 61 and the output part group 64 is coupled to one side of the memory cell array 23*a*. In addition, the shift control circuit 62 can execute both of shifting data in units of layers of the block BLKa in a direction from the first stage toward the last stage on a layer-by-layer basis, and shifting the same in a direction from the last stage toward the first stage on a layer-by-layer basis. For example, the memory device 20*a* of the LIFO method shifts the data in the direction from the first stage toward the last stage on a layer-by-layer basis when writing the data, and shifts the data in the direction from the last stage toward the first stage on a layer-by-layer basis when reading the data. Thereby, the memory device 20*a* of the LIFO method is realized.

As two memory devices 20*a* forming a mirroring function, the memory device 20*a* of the FIFO method and the memory device 20*a* of the LIFO method may be combined. When the memory device 20*a* of the FIFO method and the memory device 20*a* of the LIFO method are combined, the mirroring address allocating circuit 14 may be omitted from the memory controller 10. In this case, a physical location to store page data is the same between the principal storage region 20*a*P and the mirroring storage region 20*a*M. On the other hand, the number of reads at the same layer location is inverted between the FIFO method and the LIFO method. As a result, a combination of the memory device 20*a* of the FIFO method and the memory device 20*a* of the LIFO method can improve the latency in the same manner as in the third embodiment.

[4] Fourth Embodiment

The information processing system 1 according to a fourth embodiment has a configuration in which a function corresponding to the memory controller 10 and a function corresponding to the memory device 20 are allocated to different devices. In the following, points different from the first embodiment will be described, regarding each of an information processing system 1*a* according to a first example of the fourth embodiment and an information processing system 1*b* according to a second example of the fourth embodiment.

[4-1] Information Processing System 1*a* According to First Example

FIG. 24 is a block diagram showing an example of a configuration of the information processing system 1*a* according to the first example of the fourth embodiment. As shown in FIG. 24, the information processing system 1*a* includes the host device HD, a plurality of data servers SV1 and SV2, and a relay device 70.

The data server SV is a computer having a storage device capable of storing large-capacity data in a non-volatile manner, and has a function similar to that of the memory device 20 of the first embodiment. The data servers SV1 and SV2, for example, correspond to the principal storage region 20P and the mirroring storage region 20M of the first embodiment, respectively. The relay device 70 is a device for relaying communications between the host device HD and the data servers SV1 and SV2, and has a function similar to that of the memory controller 10 of the first embodiment. For example, the relay device 70 includes a mirroring address allocating circuit 71 and a latency determining circuit 72.

The mirroring address allocating circuit 71 has a function similar to that of the mirroring address allocating circuit 14 of the first embodiment. The mirroring address allocating circuit 71 allocates a physical address PA to a logical address LA based on a write request received from the host device HD. Then, the mirroring address allocating circuit 71 associates the physical address PA with the mirroring physical address MPA so that the same data is a combination of an address with small latency and an address with large latency in the same manner as in the first embodiment.

Among the physical address PA associated with the logical address LA and the mirroring physical address MPA calculated based on that physical address PA, the latency determining circuit 72 selects one with a small latency based on a read request received from the host device HD. Then, the latency determining circuit 72 orders the selected address (the principal storage region 20P or the mirroring storage region 20M) to read the data.

[4-2] Information Processing System 1b According to Second Example

FIG. 25 is a block diagram showing an example of a configuration of an information processing system 1b according to a second example of the fourth embodiment. As shown in FIG. 25, the information processing system 1b includes the host device HD, the relay device 70, and a plurality of data centers DS1 and DS2.

The data center DS is a set of data servers for storing large-capacity data in a non-volatile manner, and has a function similar to that of the memory device 20 of the first embodiment. The data centers DS1 and DS2, for example, correspond to the principal storage region 20P and the mirroring storage region 20M of the first embodiment, respectively. The relay device 70 of the second example of the fourth embodiment relays communications between the host device HD and the data centers DS1 and DS2 via a network NW. Configurations and operations of the mirroring address allocating circuit 71 and the latency determining circuit 72 included in the relay device 70 are similar to those of the first example of the fourth embodiment.

[4-3] Advantageous Effect of Fourth Embodiment

As described above, in the fourth embodiment, in a case where data is multiplexed and stored in a plurality of data servers SV or a plurality of data centers DS, an address with small latency is selected and the data is read in the same manner as in the first embodiment. As a result, each of the information processing system 1a according to the first example of the fourth embodiment and the information processing system 1b according to the second example can improve the latency in the same manner as in the first embodiment. Note that in the information processing system 1a, a plurality of data servers SV, each of which functions as a mirroring storage region 20M, may be coupled to the relay device 70. Similarly, in the information processing system 1b, a plurality of data centers DS, each of which functions as a mirroring storage region 20M, may be coupled to the relay device 70 via the network NW. In addition, the fourth embodiment may be combined with the second embodiment and the third embodiment.

[5] Others

Note that a part or all of the operations of the memory controller 10 may be realized by the control circuit 13 executing firmware, or may be realized by dedicated hardware included in the memory controller 10. In the above-described embodiments, the operations allocated to the mirroring address allocating circuit 14 may be processed by the control circuit 13. The LUT 17 may be stored in the RAM within the memory system MS, or may be stored in the memory device 20 in a non-volatile manner. When being stored in the memory device 20, the LUT 17 is read out to the RAM of the memory system MS when the memory system MS is powered on. In the memory cell array 23 described in the first embodiment, a plurality of memory cell transistors MT may be two-dimensionally arranged. The host device. HD and the memory controller 10 may be coupled wirelessly or by wire. Similarly, between the relay device 70 and the data server SV and between the relay device 70 and the data center DS may be wireless coupling or wired coupling.

In the present specification, a "physical location" in the first embodiment, for example, may be associated with a height at which a word line WL (memory cell transistor MT) is provided. In this case, physical locations of two word lines WL being different corresponds to distances of the two word lines WL from the semiconductor substrate 30 being different. In addition, a "physical location" in the third embodiment may be associated with a layer location at which a memory cell MC is provided. In this case, physical locations of two memory cells MC being different corresponds to layer locations of the two memory cells MC being different.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A memory controller configured to control a first memory device and a second memory device, each of the first memory device and the second memory device including a plurality of memory cells, and each of the memory cells being configured to store a plurality of bits of data including a first bit and a second bit, the memory controller comprising:
   a control circuit configured to duplicate and store data received from an external host device using the first memory device and the second memory device, wherein
   the control circuit is configured to, when a write request specifying first data and a first logical address is received from the host device:
      i) allocate a first physical address corresponding to the first bit to the first logical address, and order the first memory device to write the first data to the first physical address; and ii) allocate a first mirroring physical address corresponding to the second bit to the first physical address, and order the second memory device to write the first data to the first mirroring physical address, and a number of reads from the memory cell for reading the first bit is different from a number of reads from the memory cell for reading the second bit.

2. The memory controller of claim 1, wherein
the control circuit is configured to, when a write request specifying second data and a second logical address is received from the host device:
   i) allocate a second physical address corresponding to the second bit to the second logical address, and order the first memory device to write the second data to the second physical address; and
   ii) allocate a second mirroring physical address corresponding to the first bit to the second physical address, and order the second memory device to write the second data to the second mirroring physical address,
the plurality of memory cells included in the first memory device include a plurality of first memory cells each associated with the first physical address and the second physical address,
the plurality of memory cells included in the second memory device include a plurality of second memory cells each associated with the first mirroring physical address and the second mirroring physical address, and
the control circuit is configured to store a set of the first data and the second data in each of the plurality of first memory cells and the plurality of second memory cells.

3. The memory controller of claim 2, wherein
the number of reads from the memory cells for reading the first bit is less than the number of reads from the memory cells for reading the second bit,
the control circuit is configured to order the first memory device to read the first data from the first physical address, when a read request from the first logical address is received from the host device, and
the control circuit is configured to order the second memory device to read the second data from the second mirroring physical address, when a read request from the second logical address is received from the host device.

4. The memory controller of claim 2, wherein
the control circuit is configured to allocate the first mirroring physical address and the second mirroring physical address so that physical locations of the plurality of first memory cells in the first memory device are different from physical locations of the plurality of second memory cells in the second memory device.

5. The memory controller of claim 4, wherein
the plurality of memory cells included in the first memory device and the plurality of memory cells included in the second memory device are classified into a first group and a second group, and
the control circuit is configured to, when a write request specifying third data and a third logical address is received from the host device:
   i) allocate a third physical address to the third logical address, and order the first memory device to write the third data to the third physical address;
   ii) when the third physical address is associated with a memory cell of the first group, allocate a third mirroring physical address associated with a memory cell of the second group to the third logical address, and order the second memory device to write the third data to the third mirroring physical address; and
   iii) when the third physical address is associated with a memory cell of the second group, allocate a fourth mirroring physical address associated with a memory cell of the first group to the third logical address, and order the second memory device to write the third data to the fourth mirroring physical address.

6. The memory controller of claim 5, wherein
the memory cell of the second group is more reliable than the memory cell of the first group.

7. The memory controller of claim 3, wherein
the control circuit is configured to, when detecting that a read of the first data from the first physical address in the first memory device failed:
   i) execute a retry sequence of the read of the first data from the first physical address for the first memory device and a read sequence of the first data from the first mirroring physical address for the second memory device in parallel; and
   ii) transmit data of the retry sequence and the read sequence, whichever has succeeded in a read first, to the host device.

8. A memory system comprising:
the memory controller of claim 1;
the first memory device; and
the second memory device.

9. An information processing system comprising:
the memory controller of claim 1;
a first data server including the first memory device; and
a second data server including the second memory device.

10. A memory controller configured to control a first memory device and a second memory device, each of the first memory device and the second memory device including a shift register, the shift register storing 1-bit data for each of a plurality of layers including a first layer and a second layer, and the memory controller comprising:
a control circuit configured to duplicate and store data received from an external host device using the first memory device and the second memory device, wherein
the control circuit is configured to, when a write request specifying first data and a first logical address is received from the host device:
   i) allocate a first physical address corresponding to the first layer to the first logical address, and order the first memory device to write the first data to the first physical address; and
   ii) allocate a first mirroring physical address corresponding to the second layer to the first physical address, and order the second memory device to write the first data to the first mirroring physical address.

11. The memory controller of claim 10, wherein
the control circuit is configured to, when a write request specifying second data and a second logical address is received from the host device:
   i) allocate a second physical address corresponding to the second layer to the second logical address, and order the first memory device to write the second data to the second physical address; and
   ii) allocate a second mirroring physical address corresponding to the first layer to the second physical address, and order the second memory device to write the second data to the second mirroring physical address.

12. The memory controller of claim 11, wherein
the control circuit is configured to order the first memory device to read the first data from the first physical address, when a read request from the first logical address is received from the host device, and
the control circuit is configured to order the second memory device to read the second data from the second mirroring physical address, when a read request from the second logical address is received from the host device.

13. A memory system comprising:
the memory controller of claim 10;
the first memory device; and
the second memory device.

14. An information processing system comprising:
the memory controller of claim 10;
a first data server including the first memory device; and
a second data server including the second memory device.

15. A memory controller configured to control a first memory device and a second memory device, each of the first memory device and the second memory device including a plurality of memory cells respectively coupled to a plurality of word lines, the plurality of word lines including a first word line and a second word line whose physical locations are different from each other, and the memory controller comprising:
a control circuit configured to duplicate and store data received from an external host device using the first memory device and the second memory device, wherein
the control circuit is configured to, when a write request specifying first data and a first logical address is received from the host device:
i) allocate a first physical address corresponding to the first word line of the first memory device to the first logical address, and order the first memory device to write the first data to the first physical address; and
ii) allocate a first mirroring physical address corresponding to the second word line of the second memory device to the first physical address, and order the second memory device to write the first data to the first mirroring physical address.

16. The memory controller of claim 15, wherein
the control circuit is configured to, when a write request specifying second data and a second logical address is received from the host device:
i) allocate a second physical address corresponding to the second word line of the first memory device to the second logical address, and order the first memory device to write the second data to the second physical address; and
ii) allocate a second mirroring physical address corresponding to the first word line of the second memory device to the second physical address, and order the second memory device to write the second data to the second mirroring physical address.

17. The memory controller of claim 16, wherein
the control circuit is configured to order the first memory device to read the first data from the first physical address, when a read request from the first logical address is received from the host device, and
the control circuit is configured to order the second memory device to read the second data from the second mirroring physical address, when a read request from the second logical address is received from the host device.

18. The memory controller of claim 17, wherein
a memory cell coupled to the first word line is more reliable than a memory cell coupled to the second word line.

19. A memory system comprising:
the memory controller of claim 15;
the first memory device; and
the second memory device.

20. An information processing system comprising:
the memory controller of claim 15;
a first data server including the first memory device; and
a second data server including the second memory device.

* * * * *